United States Patent [19]
Lacas et al.

[11] Patent Number: 5,751,713
[45] Date of Patent: May 12, 1998

[54] COMMUNICATING SYSTEM

[75] Inventors: Mark A. Lacas, Redondo Beach; David J. Warman, Woodland Hills, both of Calif.

[73] Assignee: MediaLink Technologies Corporation, Seattle, Wash.

[21] Appl. No.: 119,384

[22] Filed: Sep. 13, 1993

Related U.S. Application Data

[63] Continuation of Ser. No. 810,002, Dec. 18, 1991, Pat. No. 5,245,604, which is a continuation of Ser. No. 488,728, Mar. 5, 1990, abandoned.

[51] Int. Cl.$^6$ ........................................ H04J 3/02
[52] U.S. Cl. ........................................ 370/445; 370/447
[58] Field of Search ........................................ 370/85.2, 85.3, 370/85.6, 85.7, 85.8, 431, 433, 432, 444, 442, 445, 447–452, 455, 458, 460, 462, 503, 508, 517, 519, 389; 340/94.1, 825.5, 825.51, 825.08; 371/37.7

[56] References Cited

U.S. PATENT DOCUMENTS

| | | | |
|---|---|---|---|
| 4,860,006 | 8/1989 | Barall | 370/85.3 |
| 4,888,763 | 12/1989 | Hatfield et al. | 370/85.2 |
| 4,979,168 | 12/1990 | Courtois et al. | 370/85.3 |
| 5,086,427 | 2/1992 | Whittaker et al. | 370/85.2 |
| 5,155,727 | 10/1992 | Borup et al. | 370/85.3 |
| 5,353,287 | 10/1994 | Kuddes et al. | 370/85.3 |

*Primary Examiner*—Dang Ton
*Attorney, Agent, or Firm*—Christensen O'Connor Johnson & Kindness PLLC

[57] ABSTRACT

Stations in a sequence accepting a vector from preceding stations in the sequence communicate data packets to other stations in the sequence. Each station receiving the vector is spliced out of the sequence by communicating such a desire or by failing to respond to the preceding station, which then provides for the passing of the vector to the station following the next station. Alternatively, an individual station (not in the sequence) between the communicating and next stations can be spliced into the sequence by communicating to all stations such a desire before any response from the next station. Some or all stations may be either in a performance mode higher than a set-up mode. And if in the performance mode may initiate the operation of the performance mode sequence when the other stations are in the set-up mode. During start-up, a first station identifies itself by a communication to the other stations and a special communication in the sequence which progressively patches the other stations into the sequence.

13 Claims, 8 Drawing Sheets

| | PREAMBLE | FLAG | ADDRESS | SOURCE STATION ID. | PACKET TYPE | PACKET DATA | CYCLIC REDUNDANCY CHECK | FLAG |
|---|---|---|---|---|---|---|---|---|
| VECTOR ss -> nn | III----III | IIIII | FFnn | ss | pd | pmi/pma | cccc | IIIII |
| SYNCHRONIZATION | III----III | IIIII | FEoo | ss | | | cccc | IIIII |
| SPLICE ss -> nn FOR dd | III----III | IIIII | FDnn | ss | sd | | cccc | IIIII |
| RESPONSE ss -> nn | III----III | IIIII | FBnn | ss | STATUS: ACCEPT/REJ–NO–BFFR | | cccc | IIIII |
| DATA ss -> nn | III----III | IIIII | FCnn | ss | RTV | ddd . . . ddd | cccc | IIIII |
| BROADCAST ss -> gggg | III----III | IIIII | gggg | ss | RTV | ddd . . . ddd | cccc | IIIII |
| BROADCAST -> ALL NODES | III----III | IIIII | FFFF | ss | RTV | ddd . . . ddd | cccc | IIIII |

FIG. 1

| | | | | | | |
|---|---|---|---|---|---|---|
| VECTOR ss -> nn | | | | | | |
| ‖‖--‖‖ | FFnn | ss | pd | pmi/pma | cccc | ‖‖‖‖‖ |
| SYNCHRONIZATION | | | | | | |
| ‖‖--‖‖ | FEoo | ss | | | cccc | ‖‖‖‖‖ |
| SPLICE ss -> nn FOR dd | | | | | | |
| ‖‖--‖‖ | FDnn | ss | sd | | cccc | ‖‖‖‖‖ |
| RESPONSE ss -> nn | | | | | | |
| ‖‖--‖‖ | FBnn | ss | STATUS: ACCEPT/REJ-NO-BFFR | | cccc | ‖‖‖‖‖ |
| DATA ss -> nn | | | | | | |
| ‖‖--‖‖ | FCnn | ss | RTV | ddd ... ddd | cccc | ‖‖‖‖‖ |
| BROADCAST ss -> gggg | | | | | | |
| ‖‖--‖‖ | gggg | ss | RTV | ddd ... ddd | cccc | ‖‖‖‖‖ |
| BROADCAST -> ALL NODES | | | | | | |
| ‖‖--‖‖ | FFFF | ss | RTV | ddd ... ddd | cccc | ‖‖‖‖‖ |
| PREAMBLE | FLAG | ADDRESS SOURCE STATION ID. | PACKET TYPE | PACKET DATA | CYCLIC REDUNDANCY CHECK | FLAG |

FIG. 1A

NOTES:
pd: PROCESSOR DELAY FACTOR (* 100μSECS)
pmi: PERFORMANCE MASTER INDICATOR
pma: PERFORMANCE MODE ACTIVE
RTV: REAL-TIME VECTOR CODE
sd: SPLICE DATA
ddd ... ddd: 0 OR MORE DATA BYTES FOR THE RTV

| PACKET TYPE | |
|---|---|
| 0 | LAYER MANAGEMENT ENTITY COMMANDS |
| 1 | SESSION MANAGEMENT |
| 2 | MIDI (EVENTS, REAL-TIME, SYTEM, SYSEX) |
| 3 | SMPTE |
| 4 | TAPE TRANSPORT |
| 5-255 | OTHER FUNCTIONALITIES AS ASSIGNED BY THE MMA ASSIGNABLE DYNAMICALLY FROM FFh DOWN FOR CUSTOM/PROPRIETARY APPLICATIONS |

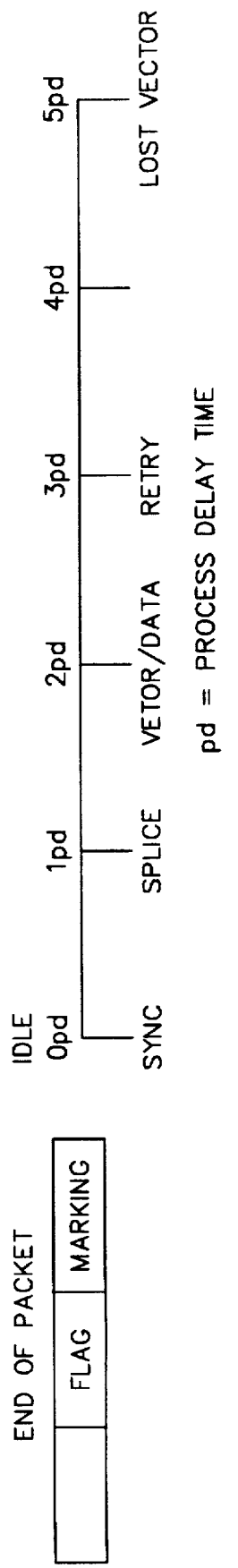
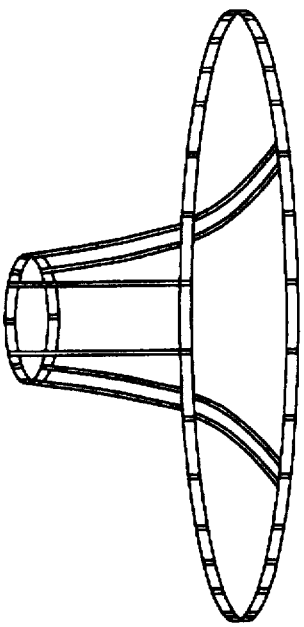
FIG. 2
FIG. 2A
FIG. 6

STATION 11 WANTS TO SPLICE:

1. 11 WAITS FOR VECTOR TO PASS HIS NUMBER.

2. 11 SENDS HIS WAITING DATA TO GROUP gggg.

3. 11 SENDS THE VECTOR TO STATION n-1.

4. 11 IS NOW SPLICED INTO THE PERFORMANCE RING.

FIG. 4A

1. STATION 8 RECEIVES THE VECTOR AND HAS NOTHING TO SEND.

2. 8 PASSES THE VECTOR TO 10.

3. 10 WANTS TO SPLICE-OUT OF THE RING. 10 SENDS A SPLICE VECTOR BACK TO 8 WITH THE DATA SECTION OF THE SPLICE VECTOR POINTING TO STATION 12.

4. THE NEXT CIRCUIT OF THE VECTOR GOES TO STATION 12 INSTEAD OF STATION 10.

FIG. 5A

CHANGE BETWEEN
SET-UP MODE
AND
PERFORMANCE MODE

SETUP MODE

PERFORMANCE MODE

ONE LOST STATION

TWO LOST STATIONS

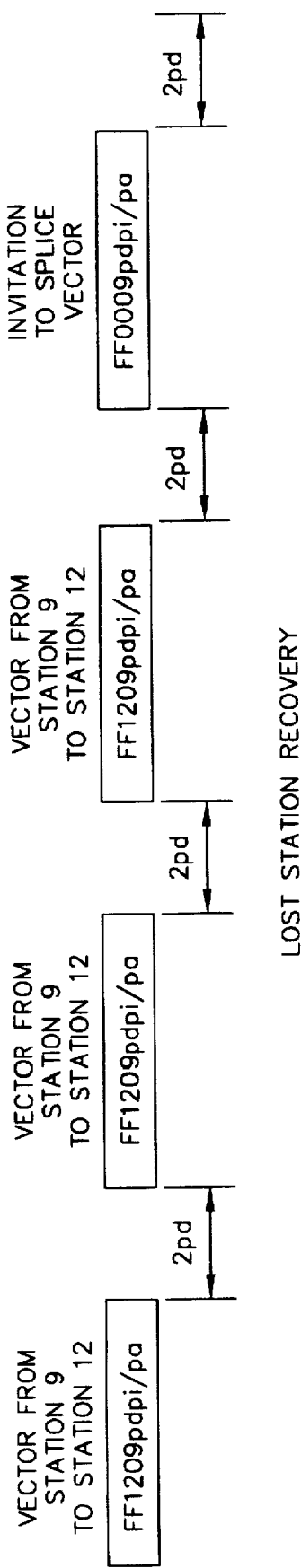
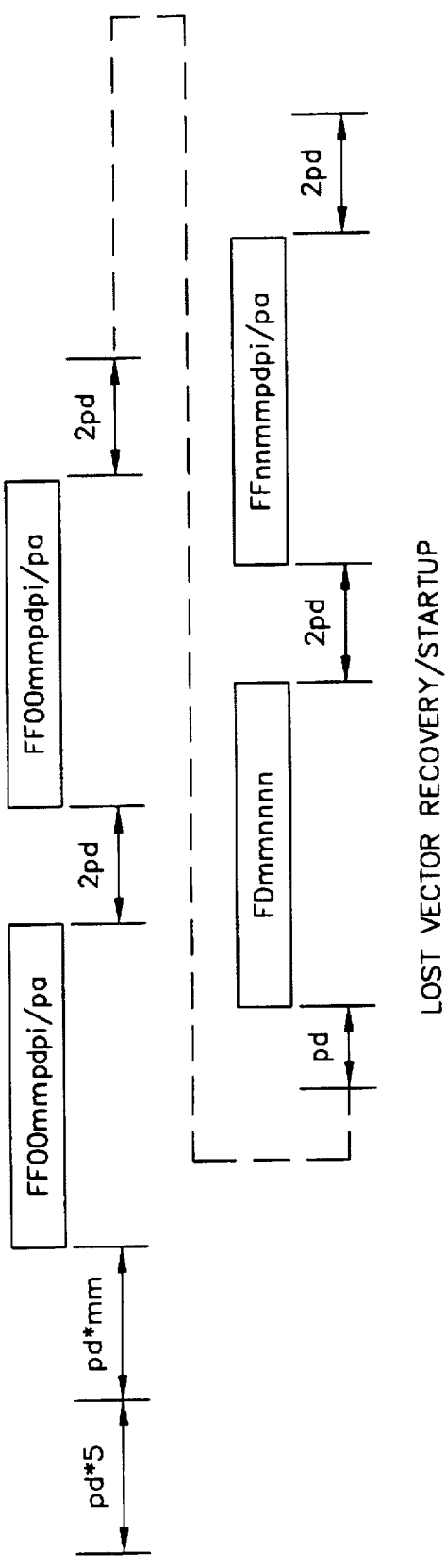

5,751,713

COMMUNICATING SYSTEM

REFERENCE TO RELATED APPLICATIONS

The present application is a continuation of U.S. patent application Ser. No. 07/810,002 filed Dec. 18, 1991, now U.S. Pat. No. 5,245,604, now U.S. Pat. No. 5,245,604, issued Sep. 14, 1993, which, in turn, is a continuation of U.S. patent application Ser. No. 07/488,728 filed Mar. 5, 1990, and now abandoned.

BACKGROUND OF THE INVENTION

1. Field of the Invention

This invention relates to a system including a plurality of stations disposed in a logical sequence for providing a communication of data between different stations in the sequence in the sequence on a cyclic basis.

2. Description of the Prior Art

Systems for recording and controlling the creation of music have become increasingly complex and sophisticated with the advent and development of digital computers and data processing systems. For example, a musical product can be shaped by the use of systems including digital computers and data processing to provide sounds and effects not capable of being provided from the capabilities normally provided by any instrument or combination of instruments.

Even though the systems now in use can provide sounds and effects not capable of being normally provided by any instrument or combination of instruments, such systems have severe limitations in their use. For example, the systems now in use transmit data from different stations in the system at a relatively low rate such as approximately 31.25 kilobits per second. This limits the number of stations which can be included in the system before undesirable audible effects occur. For example, when ten (10) stations are included in such a system, the delay between the communication of information from the first and last stations is audible to the ear. When as many as twenty (20) stations are included in the system, the delay between communications from the first and last stations is objectionable. This can be overcome somewhat by providing parallel networks but it is not easy to construct or control such configurations.

The systems now in use enable a plurality of music synthesizers from different manufacturers to be controlled from a single source at the same time. However, the systems do not have the flexibility of providing for the insertion of new stations into the sequence or of providing for the removal of stations from the sequence without affecting at least temporarily the sound produced by such systems. Because of this, the systems now in use do not have the flexibility which performers often desire and even require. For example, they prevent different synthesizers and master keyboards from being included in the system on a flexible basis.

The systems now in use also lack other flexibilities. For example, during the time that a system is being set up, different stations in the set-up mode may transmit data packets to other stations in the set-up mode. In this way, adjustments can be provided in the sound and sound effects transmitted by the different stations to provide a balance in the composite sound from the different stations. After this adjustment has been provided, it may be desired to provide for an operation of the stations in a performance mode where the performers at different stations actually perform in producing music which is melded into a composite sound. It may be desired to have not all of the stations in the set-up mode included in the performance mode.

The systems now in use are not able to be converted easily from the set-up mode to the performance mode, particularly when only selected stations in the set-up mode operate in the performance mode. For example, the systems now in use often require changes in the connections between different stations to be made physically under such circumstances so that an interruption in the operation of the system occurs.

The limitations discussed in the previous paragraph have been compounded or aggravated because the instruments, such as synthesizers, at the different stations have been manufactured by different companies and have been provided with different data bases by such different manufacturers. This has required different programs to be used for the different stations. Even with the expanded capabilities of current data processing systems, it has been difficult for the data processing systems to meld the different programs into an operative system.

There are other serious problems with the systems now in use. For example, several stations may inadvertently become simultaneously disconnected from the system. Under such circumstances, it has been difficult for the systems now in use to adapt quickly to restore such stations into the system. As another example, when the power to the systems now in use has been turned on, it has been difficult for the stations to become programmed into the system automatically and quickly in a particular sequence.

This invention provides a system which overcomes all of the limitations discussed in the previous paragraph. The system of this invention is able quickly to splice stations into a sequence or splice stations out of the sequence in accordance with communications from such stations without affecting the operation of other stations in the sequence. It is also able to splice stations quickly out of a sequence without affecting the operation of other stations in the sequence when attempts to communicate with such spliced-out stations are unsuccessful. It is able to change between a set-up mode and a performance mode in accordance with communications from such stations which will be operating in the performance mode. It is also able to return at any time to the set-up mode. It is able to restore stations into the system, without affecting the operation of other stations in the sequence and without any noticeable interruption in the operation of the system, when such stations are inadvertently lost from the system. It is further able to connect the stations quickly in a proper sequence in the system when power is first applied to the system in a start-up mode.

In one embodiment of the invention, stations accepting a vector from preceding stations in the sequence communicate data packets to other stations in the sequence. Each station receiving the vector can become spliced out of the sequence by communicating such a desire to the preceding station in the sequence. The communicating station then provides for the passing of the vector to the station following the next station in the sequence.

Alternatively, an individual station (not in the sequence) between the communicating and next stations can communicate to all stations, before any response from the next station, its desire to be spliced into the sequence. This station then splices into the sequence. If the next station does not respond to the station communicating with it, the communicating station can splice the next station out of the sequence and provide for the passing of the vector to the station following the next station in the sequence.

When stations in the sequence are in a set-up mode, only some stations may be in a performance mode higher than the set-up mode. Any station programmed to be active in the sequence and to operate in the performance mode may initiate an operation in the performance mode sequence when the stations are in the set-up mode. In each cycle of operation in the performance mode, if no station in the performance mode requests the operation to continue in the performance mode, the stations will revert to the set-up mode.

If several successive stations become lost from the sequence, the sequence becomes patched by a special communication from the station preceding such successive stations to include the next one of these successive stations in the sequence. This station then patches itself into the sequence. This process continues until all of the stations have been patched into the sequence. In a start-up operation, a first station identifies itself, and by communication to the other stations the special communication then occurs in the sequence described above in this paragraph to progressively patch such other stations into the sequence.

In the drawings:

FIG. 1 illustrates the format of signals communicated between different stations in a sequence defining one embodiment of this invention;

FIG. 1A is a table indicating different types of information represented by the format shown in FIG. 1;

FIG. 2 illustrates the time sequence for the transmission of the signals in the format shown in FIG. 1;

Figure 3:
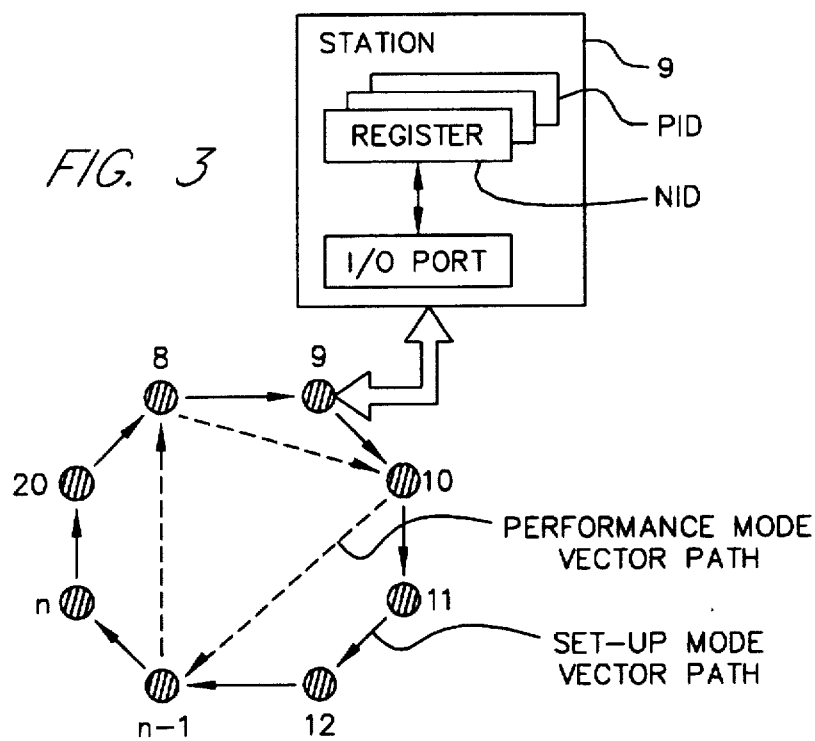
Figure 4:
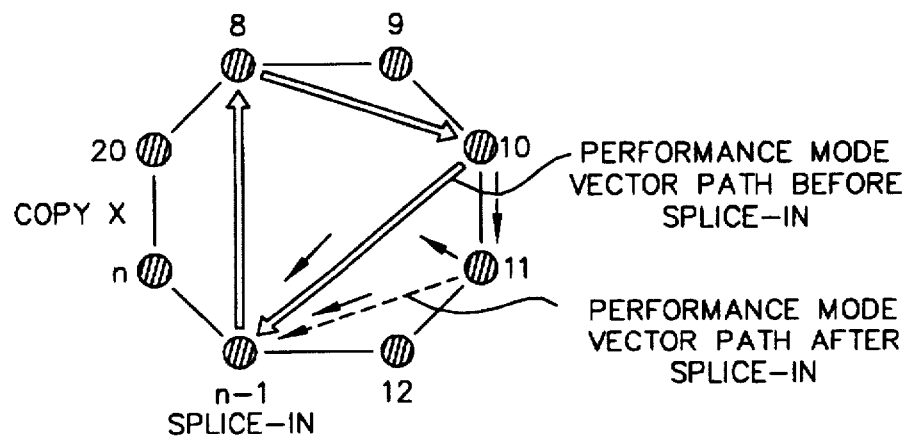
Figure 5:
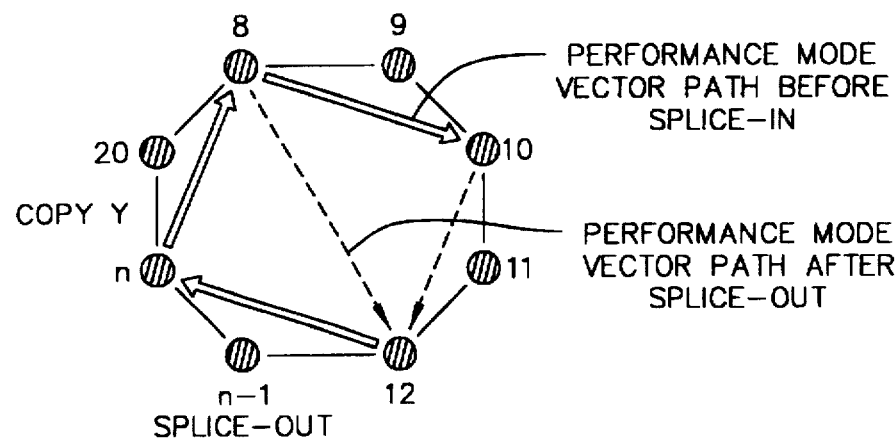
Figure 7:
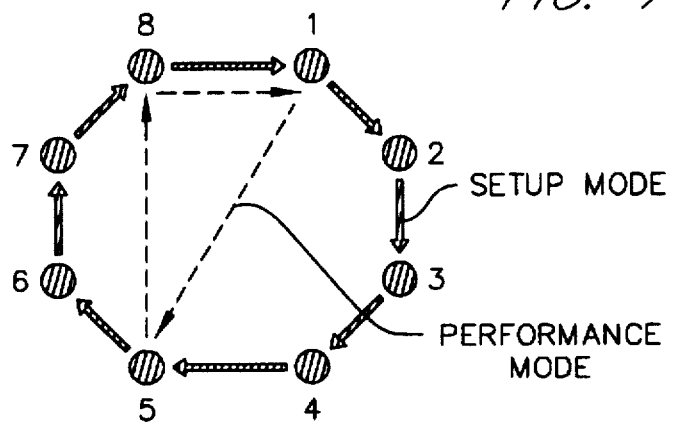
Figure 8:
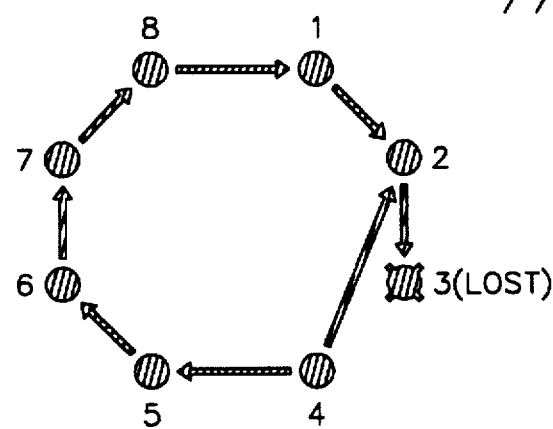
Figure 9:
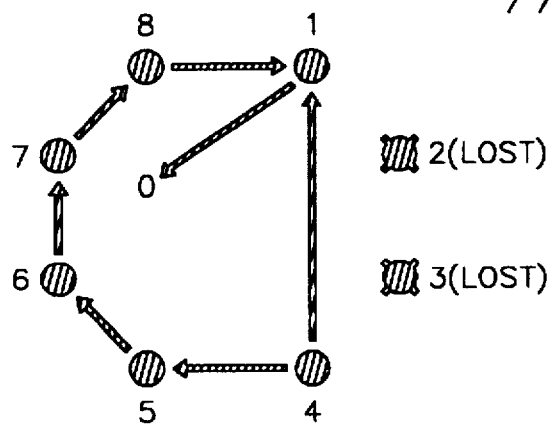

FIG. 2A indicates different registers included at each station in the sequence to provide for the proper operation of such station in the sequence;

FIG. 3 illustrates a first sequence of stations in a set-up mode and another sequence of stations in a performance mode, the performance mode being at a higher level than the set-up mode, and further illustrates how a vector is passed to successive stations in each of the sequences respectively constituting the set-up mode and the performance mode;

FIG. 4 illustrates the relationship of the stations shown in FIG. 3 when an additional station not in a sequence is to be spliced into the sequence and the relationship of the stations after the additional station has been spliced into the sequence;

FIG. 4A illustrates an example of the sequence of events for splicing into the sequence the additional station shown in FIG. 4;

FIG. 5 illustrates the relationship of the stations shown in FIG. 3 when one of the stations in the sequence is to be spliced out of the sequence and further illustrates the relationship of the stations when such station has been spliced out of the sequence;

FIG. 5A illustrates an example of the sequence of events for splicing out of the sequence the station shown in FIG. 5;

FIG. 6 figuratively illustrates the interrelationship between the stations in the set-up mode and the stations in the performance mode, the performance mode being at a higher level than the set-up mode;

FIG. 7 provides a schematic illustration of the interrelationship between the stations in a set-up mode and the stations in a performance mode when the stations are changed from an operation in the set-up mode to an operation in the performance mode;

FIG. 8 illustrates the relationship between a plurality of stations in a sequence and further illustrates the interrelationship established between such stations when one of the stations is lost from the sequence;

FIG. 9 illustrates the relationship between a plurality of stations in a sequence and further illustrates the interrelationship established between such stations when more than one of the stations is lost from the sequence; and FIGS. 10A–10F provide specific examples on a timed basis of different types of operations shown in FIGS. 3–9.

This invention includes a plurality of stations displaced from one another and operative to become activated in a logical sequence. For example, in the embodiment shown in FIG. 3, a plurality of stations designated as 8, 9, 10, 11, 12. n−1 and n are displaced from one another and are operative to become activated in a sequence. As one example, different musical instruments may be disposed at individual ones of the stations in the sequence. Alternatively, musical equipment may be disposed at certain stations in the sequence and control equipment such as equipment for receiving data to provide for a blending and shaping of the sounds from the different instruments may be disposed at other stations in the sequence. However, it will be appreciated that the disposition of musical instruments and controls at the individual stations in the sequence is only by way of illustration and that other types of equipment may be disposed at the stations in the sequence for purposes far removed from the blending and shaping of musical sounds.

Alternatively, the same type of equipment may be disposed at the individual stations in the sequence but different types of messages may be transmitted from such equipment at the individual stations in the sequence to other stations in the sequence. These types of messages may constitute measurements of parameters such as temperature, pressure and humidity. These measurements may be transmitted from each station in the sequence to other stations in the sequence to control the operation of equipment at such other stations or may be transmitted to a centralized data processing station which then processes such signals and communicates with the stations to indicate how such stations should operate.

In the normal mode of operation, the stations in the sequence become successively activated. For example, station 8 in FIG. 3 may be initially activated by the passage of a vector to station 8. When activated, station 8 may communicate a data packet to another station, such as station 12, in the sequence. Such a communication will be discussed in detail subsequently. The data packet communicated from station 8 to station 12 may include data representing sounds from a musical instrument, or from musical instruments, at station 8. Alternatively, the data packet communicated from station 8 to station 12 may be an instruction to station 12 to emphasize sound in a certain frequency range or to mute sound in another frequency range.

It will be appreciated that data representing sounds are only one of a myriad of different communications which may be provided by the station 8 and the other stations in the sequence. For example, although the invention is specifically disclosed with reference to musical equipments and musical systems, it will be appreciated that the invention is intended to receive and communicate data, preferably in digital form, relating to any parameters, equipments and systems.

After station 8 has communicated the data packet to station 12, station 8 communicates in FIG. 3 a packet to the other stations to activate a particular one of the stations in the sequence. For example, station 9 may be the next station in the sequence. Although the activating packet may be communicated to all of the stations in the sequence, it may be specifically directed in its coding to the station to be activated. To distinguish between the communication of a data packet and the communication of a packet for activating a station (e.g. station 9), the communication of the activating packet to all of the stations, but intended for a particular station, is designated as "providing for the passing of a vector". The passing of the vector from station 8 to all of the stations occurs through the transmission of information from station 8 in a form which station 9 can identify as the passing of the vector to station 9 by specific information in such transmission.

When station 9 receives the vector from station 8, station 9 transmits a data packet to another station such as station n. This indicates to station 8 that station 9 has received and accepted the vector. Station 9 then provides for the passing of the vector to station 10 by communicating the vector to all of the stations in the sequence. However, the vector is specifically directed in its coding to station 10, the next station in the sequence shown in FIG. 3. In this way, each station in the sequence progressively receives the vector and transmits a data packet to another station, or other stations, in the sequence.

This invention is able to accomplish results not capable of being accomplished in the prior art. For example, as shown by double lines in FIG. 4, a sequence may constitute stations 8, 10 and n−1. When the vector has passed to station 10 and station 10 has transmitted a data packet to another station, station 10 then provides for the passage of the vector to station n−1 by communicating the vector to all of the stations but specifying station in the coding in such communication. However, before station n−1 can accept the vector from station 10, station 11 can intervene and send a data packet to another station. Station 11 is able to intervene at this time because it is disposed between stations 10 and n−1. Station 11 then provides for the passing of the vector to station n−1 for the transmission of a data packet from station n−1.

Station 11 is thereafter spliced into the sequence so that the sequence includes stations 8, 10, 11 and n−1. In such a sequence, station 11 receives the vector from station 10 in each cycle of operation and provides for the passing of the vector to station n−1. This is indicated by broken lines between stations 10 and 11 and between stations 11 and n−1 and by double lines between stations n−1 and 8 and between stations 8 and 10.

The sequences discussed above and other sequences will be discussed in detail subsequently. For example, in FIG. 5, station 10 may be spliced out of a sequence originally constituting stations 8, 10, 12 and n (as indicated by double lines joining the stations) and subsequently constituting stations 8, 12 and n. In the sequence shown in FIG. 5, station 10 is spliced out of the sequence specifically on the basis of instructions from such station.

FIG. 1 indicates the different types of packets communicated between stations in a sequence. Each packet is in a particular format. For example, each packet initially may include a "Preamble". The preamble may be in a form to synchronize the transmission of information by one (1) station with the reception, acknowledgement and decoding of such information by another station. For example, each preamble may consist of sixteen (16) successive binary bits each having a logic level designating a binary "1".

Following the preamble in each packet in FIG. 1 is a "Flag". The flag may consist of a plurality of binary bits in a particular pattern. For example, the flag may consist of six (6) successive binary bits each having a logic level designating a binary "1". The flag may identify that the transmission of pertinent information in each packet follows the flag.

After the generation of the flag, each packet may include an "Address" designating the station or stations to which the packet is being sent. For example, different stations are identified in FIG. 1 as "FFnn", "FEoo", "FDnn", "FBnn", "FCnn", "FFFF" and "gggg". The designation "gggg" indicates that the data packet is to be transmitted by the communicating station to all of the other stations in the sequence. The address in each data packet may be in the form of a plurality of binary bit s in a hexadecimal code. This format constitutes a world-wide standard well known in the art.

Packets with an "Address" of "FFFF" are to be received and processed by all of the stations in the sequence. An Address of "FFFF" is used for such functions as system timing information and sequencer controls. An Address flag of "FFnn" is used to implement the protocol of providing for the passing the vector. An Address of "FEnn" indicates the transmission of a packet to a particular station, which then acknowledges the receipt of the packet by sending a response packet to this effect to the communicating station. The Address "FDnn" represents the response packet which the receiving station sends to the communicating station to acknowledge that it has received the packet from the communicating station. An Address of "FCnn" is actually not being used at present but is being reserved for future applications. In each of the different Address, different designations between "oo" and "nn" are used to identify individual stations in the sequence.

As indicated in FIG. 1, the station providing the communicating packet may next identify itself in a plurality of bits designated as "Source station ID". This identification is stored in a register identified as "MID" (meaning "My Identification") in FIG. 2A. In FIG. 1, each of the different examples is identified as being transmitted by a single source. This source is identified in FIG. 1 as "ss". It will be appreciated that different designations may be provided for the individual stations in the portion of each packet identified as "Source Station ID".

Particular information identified as "Packet Type" in FIG. 1 is then transmitted in each packet to indicate the type of packet being communicated. For example, the particular information may indicate that the communicating station desires to be spliced into the sequence or that it desires to be spliced out of the sequence. The particular information identified as "Packet Type" may also indicate the speed of response of the communicating station. This is indicated by the designation "pd" in FIG. 1. Each station in the sequence may have an individual speed of response and this speed of response may be different from the speed of response of the other stations in the sequence. The system then adjusts its speed of response automatically to the station having the lowest speed of response in the sequence.

The particular information identified as "Packet Type" in each packet may also provide a wide variety of other indications. These are numbered in FIG. 1 as "0"–"225" in the column under the portion of the communication identified as "Packet Type". For example, the numeral "4" may designate the operation of a tape transport. As another example, the numeral "2" may designate "MIDI" (events, real-time, system, SYSEX). The term "MIDI" refers to a system now in widespread use for providing a digital control on a remote basis over the operation of musical synthesizers. Such a system does not have a number of the features disclosed and claimed for the system of this invention.

The "Packet Type" may also identify in coded form a "Real Time Vector" ("RTV") indicated in FIGS. 1 and 1A.

The Real Time Vector indicates that information such as numerical information is being transmitted in the following portion (designated as "Packet Data") in each packet. This Real Time Vector may be further defined in the "Packet Data" (the portion of the packet following the "Packet Type") by a zero (0), a one (1) or a number of data bytes. The data bytes are identified schematically in FIG. 1 as "ddd . . . ddd" to indicate that the number of data bytes is variable for each packet communicated from a station in the sequence to one or more of the other stations in the sequence. The letter "d" symbolically indicates that any value can be provided in the sequence designated as "ddd . . . ddd".

After the vector has been passed from a station in the sequence to the next station in the sequence, (e.g. from station 8 to station 9 in FIG. 3), the station (e.g. station 9) receiving the vector communicates certain information in the portion of each communication designated as "Packet Data". This portion of the communication follows the portion of the communication identified as "Packet Type" information in the "Packet Data". For example, it provides information designated as "pmi" in FIGS. 1 and 1A. This identifies whether the station (e.g. station 9) receiving the vector will be one of the active stations in the sequence at level "pmi", when the level "pmi" should become active. It also identifies, as by the designation "pma" in FIGS. 1 and 1A, the mode (or hierarchy) of the ring in which the different stations are currently operating. For example, as shown in FIG. 6, a set-up mode may be used while the sounds from the instruments at the different stations are being blended and shaped by the data transmitted between stations. A performance mode may be used after the sounds of the instruments at the different stations have been blended and shaped and the performance is about to begin. Generally, the number of stations in the performance mode is less than the number of stations in the set-up mode. The "pma" code identifies the particular mode in which the station (e.g. station 9) passing the vector is operating.

It will be appreciated that the "pmi" and "pma" codes appear in the "Data Packet" when one station communicates a vector to all of the other stations but identifies in the vector packet that a particular one of the stations is to receive the vector. It will also be appreciated that there may be more than two (2) modes without departing from the scope of the invention. For example, sixteen (16) different modes may be provided through the use of four (4) binary bits having individual patterns of operation to represent the different modes. It will be further appreciated that a transition can be made from any of the modes to any other one of the modes by selecting individual patterns for the four (4) binary bits.

After the communication of the "Packet Data", a plurality of bits are generated in each packet. These bits are indicated in FIG. 1 by the portion of the packet designated as "Cycle Redundency Sum" and are illustratively identified in FIG. 1 as "cccc". These bits are used to check the bits previously generated in each packet and indicate from such check whether all of the bits required to be generated in each of the previous portions of the packet have been properly generated. A cycle redundency verify to check the proper generation of the previous bits is well known in the art.

Each packet includes a flag at the end of the packet. This flag may include a plurality of bits in a particular format. This format may illustratively constitute a sequence of six (6) binary 1's. The flag at the end of the packet indicates that the generation of the packet has been completed.

To separate the generation of successive packets, an idle period is imposed after each such generation. This idle period insures that the generation and processing of information in each packet will be separate from the generation and processing of information in other packets so that there will be no interference or conglomeration between the information in different packets. This idle period may be represented by the generation of a plurality of bits in a particular format. For example, the idle period may be represented by the generation of sixteen (16) successive binary 1's.

FIG. 2 indicates the generation of successive packets and the significance of such successive generations. As previously indicated, each packet is generated at a particular rate controlled by the station in the sequence with the slowest response time. The particular rate may also be dependent upon the length of the lines between the different stations in the sequence. This delay time may be quite long since one station in a sequence may illustratively be in Los Angeles and another station in the sequence may illustratively be in Kansas City. The time for the generation of each packet is designated as the "process delay time" and is identified as "pd" in such drawings as FIGS. 1, 1A and 2. The process delay time for the generation of each packet may illustratively be one hundred microseconds (100 μsec.).

As shown in FIG. 2, a station (e.g. station 8) may initiate the generation of a packet to another station (e.g. station 9) at zero process delay time (0 pd). This packet may constitute the generation of data or the generation of a vector which may be broadly considered as one form of data. Station 9 does not acknowledge the receipt of this packet until after a particular period of time such as one process delay time (1 pd). This acknowledgement is provided by the communication of a data packet by station 9 to another station, a group of stations or all of the stations in the sequence. This is indicated in FIG. 2 by the designation "Vector/Data". This represents a period of two process delay time (2 pd) after station 8 has completed the transmission of the packet to station 9. The data packet may also constitute the transmission of a vector if station 9 does not have to, or does not wish to, transmit data to another station.

Each station identifies in a register the next station in a sequence. This register is identified in FIG. 2A as "NID" (meaning "Next Identification"). Furthermore, each station receiving a vector identifies the station passing the vector. This identification is made in a register identified in FIG. 2A as "PID" (meaning "Previous Identification"). Each station also has a register identified in FIG. 2A as "PNID". This indicates the next station in the sequence with an operation in the performance mode.

FIG. 3 indicates a plurality of stations in a set-up mode. These stations illustratively include stations 8, 9, 10, 11, 12, n-1 and n. The stations are in the set-up mode to make certain that the stations are all operating properly. The stations are also often in the set-up mode to provide for a processing of the data, such as data representing sounds from the different stations to blend and shape such sounds.

It will be appreciated that each station (e.g. station 8) in the set-up mode provides for the passing of the vector to the next station (e.g. station 9) in the set-up mode in FIG. 3. The provision for the passing of the vector is indicated at "FF" in the address in FIG. 1 and the station receiving the vector is generally identified by the designation "nn" following the code "FF" for the provision of the passaging of the vector.

After receiving the vector, each station in FIG. 3 is also able to transmit a "data packet" to any other individual station in the sequence. The address portion of the data packet in FIG. 1 indicates the station or station receiving such data packet. The designation "nn" following the designation "FE" in FIG. 1 indicates on a general basis the particular station to which the data packet is being communicated. Alternatively, each station receiving the vector is able to communicate a data packet to a selective group of stations in the sequence. For example, station 8 may communicate a data packet to all of the stations where a guitar is located. This is indicated at "gggg" in FIG. 1. As a further alternative, each station may communicate a data packet to all of the other stations in the sequence. This is indicated at "FFFF" in FIG. 1. This is designated as a "broadcast" mode.

When a station (e.g. station 12) individually receives a data packet from a communicating station (e.g. station 8), it responds after a particular period such as one process delay time (1 pd). This response from station 12 acknowledges to station 8 that it has received the data packet. The acknowledgement of the receipt of a data packet by a receiving station (e.g. station 12) to a communicating station (e.g. station 8) is indicated in FIG. 1 by a designation such as "FD" in the address portion of the packet transmitted by station 12 to station 8. This is followed in the Address by bits (generally designated as nn in FIG. 1) identifying the station 8.

Figure 10A:
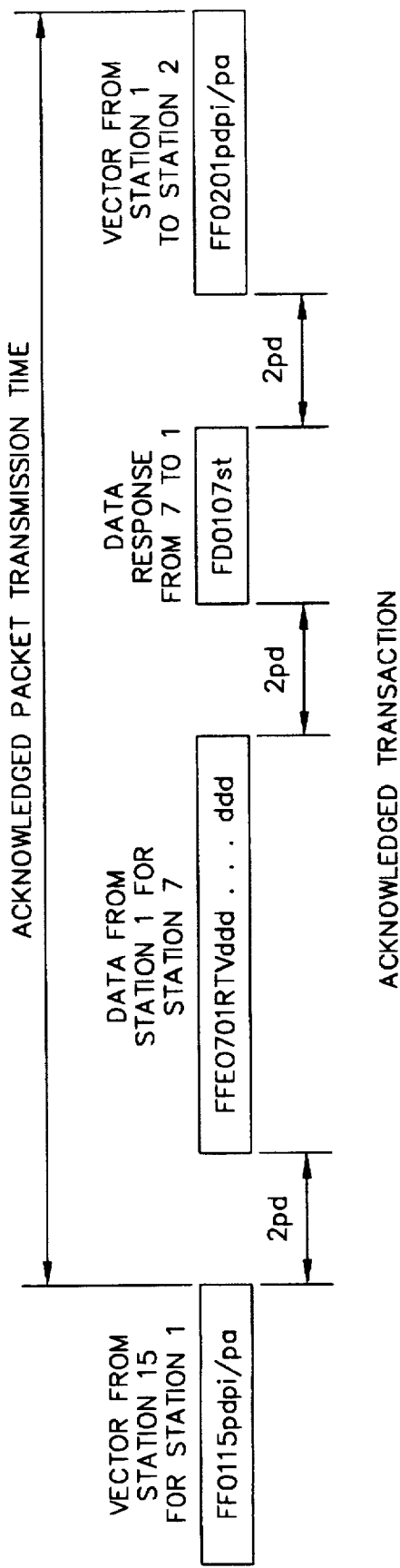

An example of the acknowledgement of a communication of a data packet is also indicated in FIG. 10A. In FIG. 10A, a vector passes from station 15 to station 1. After a delay of two process delay times (2 pd), station 1 communicates a data packet individually to station 7. After an additional delay of two process delay times (2 pd), station 7 acknowledges to station 1 that it has received the data packet from station 1. Two process delay times (2 pd) later, station 1 provides for the passing of the vector to station 2.

Figure 10B:
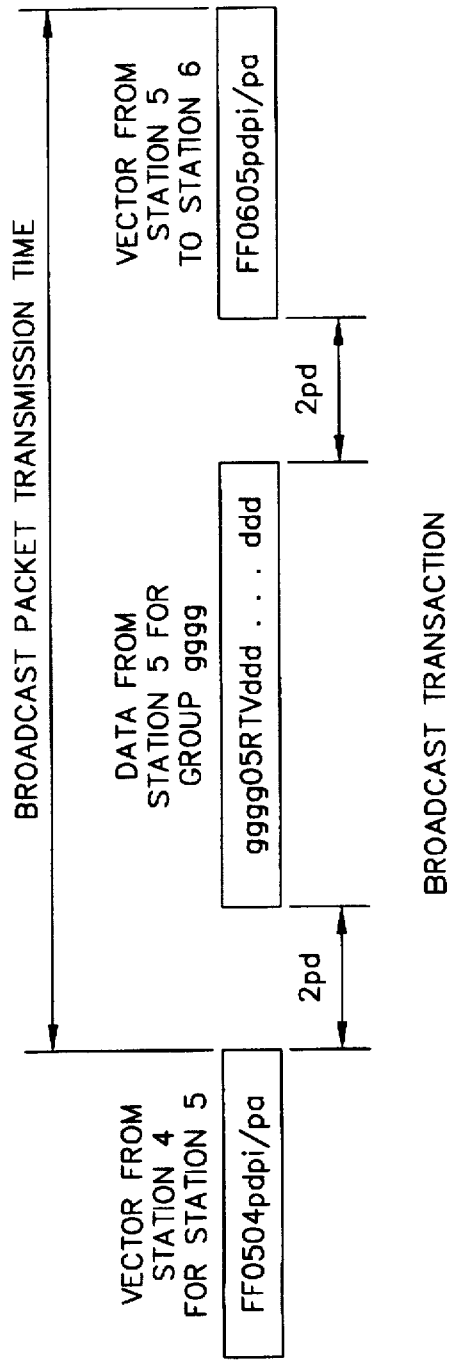

FIG. 10B illustrates the multicast of a data packet from a station to a specialized group of stations designated as stations gggg and the time sequence involved in such a broadcast. In FIG. 10B, a vector passes from station 4 to station 5. After a delay of two process delay times (2 pd), station 5 communicates a data packet to the stations in the selected group gggg. As previously described, the selected group may be illustratively be those stations having a guitar located at the stations. Since a group of stations is involved and particularly since the group may be large, the stations in the group gggg do not acknowledge to station 5 that they have received the data packet from station 5. Instead, after an additional period such as one process delay time (1 pd), station 5 provides for the passing of the vector to station 6.

As previously indicated, a communicating station may sometimes broadcast a data packet to all of the other stations in a sequence. Under such circumstances, the stations receiving the vector do not communicate to the communicating station that they have received the data packet. Instead, after an additional delay period such as one process delay time (1 pd), the communicating station provides for the passage of the vector to the next station in the sequence.

FIG. 3 indicates a group of stations 8, 9, 10, 11, 12, n-1 and n operative in a set-up mode. This is indicated in FIG. 3 by solid lines extending between successive pairs of stations in the sequence constituting the set-up mode. FIG. 3 also indicates a group of stations operative in the performance mode. Since the performance mode is generally at a higher level than the set-up mode, not all of the stations in the set-up mode are included in the performance mode. The stations in the performance mode in FIG. 3 constitute stations 8, 10 and n-1. The stations in the performance mode are indicated in FIG. 3 by broken lines extending between the stations. As described previously and will be as described in detail subsequently, operations may be provided in the set-up mode and in the performance mode at different times.

FIG. 4 also illustrates, by single lines between stations, the stations operating in the set-up mode and further illustrates, by double lines, the stations operating in the performance mode. Assume for the subsequent discussion in this paragraph and the following paragraphs that the stations in FIG. 4 are operating in the performance mode. These stations constitute stations 8, 10 and n-1. When the vector has passed to station 10 and station 10 has communicated a data packet to one or both of the other stations in the performance mode, station 10 then provides for the passing of the vector to station n-1. Station n-1 would normally communicate a data packet to another station, as other stations, in the sequence after two process delay times (2 pd) discussed above (and as shown in FIG. 2 by the indication "vector/data" at 2 pd). However, after one process delay time (1 pd), any station between station 10 and station n-1 has the right to send a data packet that it wishes to be spliced into the sequence. This time splice is indicated in FIG. 2 by the word "splice" adjacent the time delay indicated at one process delay time (1 pd). The splicing station directs a splice packet to station 10 to cause station 10 to modify its next identification (NID) station information to specify such splicing station.

In the example shown in FIGS. 4 and 4A, station 11 provides a communication after one process delay time (1 pd) that it wishes to be spliced into the sequence. Furthermore, in the example shown in FIG. 4A, station 11 communicates a data packet to a special group of stations, such as stations "gggg", with individual characteristics common to the group. Station 11 then provides for the passing of the vector to station n-1. Thereafter station 11 is included in the performance mode. As a result, station 10 thereafter provides for the passing of the vector to station 11 and station 11 provides for the passing of the vector to station n-1. This is indicated in FIG. 4 by a broken line extending between stations 10 and 11 and by another broken line extending between stations 11 and n-1.

Figure 10C:
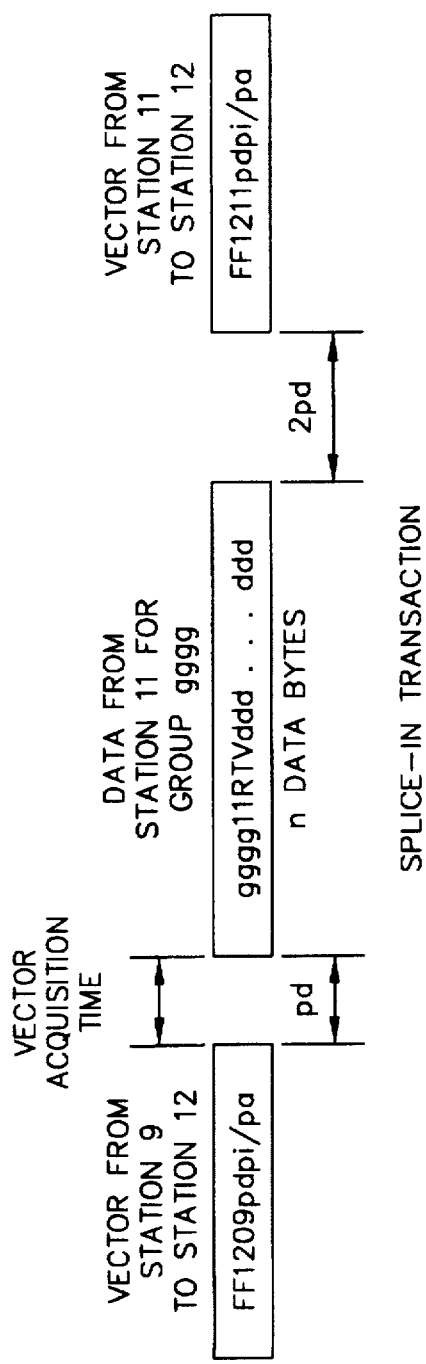

FIG. 10C illustrates another example of a splice-in transaction and further illustrates the time sequence for this transaction. In the splice-in transaction of FIG. 10C, station 9 provides for the passing of the vector to station 12. After one process delay time (1 pd), station 11 sends a data packet to a special group of stations gggg having common characteristics different from the other stations in the sequence. This data packet consists of a Real Time Vector of n data bytes designated as "ddd ... ddd". After two (2) additional process delay times (2 pd), station 11 provides for the passing of the vector to station 12. Station 11 is thereafter spliced into the station. Station 11 accordingly receives the vector from station 8 and station 12 subsequently receives the vector from station 11.

FIGS. 5 and 5A illustrate an example where a station is spliced out of a sequence by a voluntary and positive action of that station. In the example shown in FIG. 5, stations 8, 9, 10, 11, 12, n-1, n and 20 are shown by single lines between pairs of successive stations as constituting a sequence in the set-up mode. Stations 8, 10, 12 and n are shown by double lines in FIG. 5 as constituting a sequence in the performance mode. The line between stations 10 and 12 in this sequence is shown in broken lines since station 12 is to be voluntarily and positively spliced out of the system. For the purposes of the example in FIGS. 5 and 5A, assume that the stations are in the performance mode, that the vector has passed to station 8 and that station 8 provides for the passing of the vector to station 10. Assume also that station 10 does not wish to be included any longer in the sequence constituting the performance mode.

When station 10 receives the vector in the example shown in FIGS. 5 and 5A, it sends a data packet back to that it no longer wishes to be included in the performance mode sequence. This data packet further indicates that station 8 should subsequently provide for the passing of the vector to station 12. Station 8 than provides for the passing of the vector to station 12 and station 12 accepts the vector from station 8 by communicating a data packet to another station. The performance mode sequence then consists of stations 8, 12 and n, as indicated by the double lines between stations 12 and n and between stations n and 8 and as indicated by the single line between stations 8 and 12.

Figure 10D:
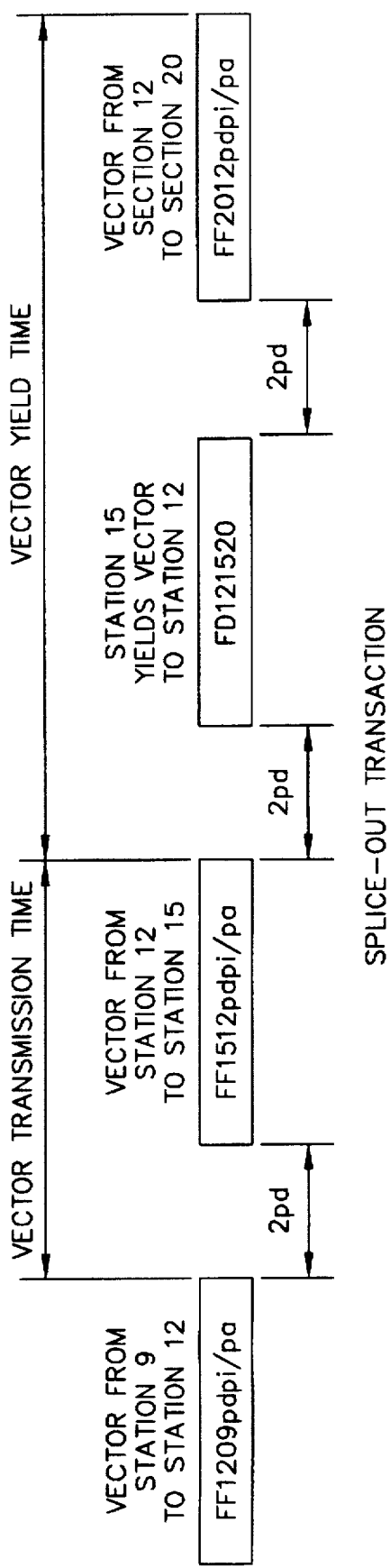

An example of a splice-out transaction is also shown in FIG. 10D, which also shows the time sequence for the transaction. In FIG. 10D, station 12 initially receives the vector from station 9. Station 12 then attempts to provide for the passing of the vector to station 15 after two process delay times (2 pd). After two additional (2) process delay times, station 15 communicates a data packet that station 12 should provide for the passing of the vector to station 20. After two further process delay times (2 pd), station 20 accepts the vector from station 20 by communicating a data packet to another station.

It may sometimes happen that a station is lost from the sequence. This is illustrated in the example shown in FIG. 8. In the example shown in FIG. 8, a sequence intially consists of stations 1, 2, 3, 4, 5, 6, 7 and 8. When the vector passes from station 1 to station 2, station 2 communicates a data packet to one or more of the other stations in the sequence and then attempts to provide for the passing of the vector to station 3. However, for one reason or another, station 3 may be temporarily or permanently out of the sequence. For example, the power to station 3 may be temporarily interrupted or there may be a malfunction of equipment at station 3.

As shown in FIG. 2, station 3 would normally respond, after two process delay times (2 pd) from the passage of the vector from station 2, by communicating a data packet to another station or passing the vector. Since station 3 is incapable of communicating a data packet to another station because of a power loss or a malfunction, station 3 does not provide such a communication. Station 2 then provides for the passing of the vector again to station 3 after an additional period of two process delay times (2 pd).

If station 3 does not respond after such additional period of two (2) process delay times, station 2 again provides for the passing of the vector to station 3 for a third (3rd) time. If station 3 does not respond within two (2) process delay times from the third (3d) communication of the vector from station 2, station 4 may communicate a data packet that station 2 should pass the vector to station 4. Station 2 then splices station 3 out of the sequence and provides for the passing of the vector to station 4. Thus, after a total period of eight (8) process delay times (6 pd), station 4 communicates a data packet to another station. When station 2 thereafter splices station 3 out of the sequence, the system in FIG. 8 includes stations 2, 4, 5, 6, 7 and 8.

It may occasionally happen that two (2) or more successive stations in a sequence are involuntarily lost temporarily or permanently from a sequence. For example, some one may have involuntarily or inadvertently opened a master switch controlling the operation of more than one successive station in a sequence. An example of this is shown in FIG. 9 where stations 3 and 4 are temporarily or permanently lost from a sequence initially consisting of stations 1, 2, 3, 4, 5, 6, 7 and 8. If the example of FIG. 9 corresponded to the example of FIG. 8, station 3 would communicate with station 1 after station 1 attempted to provide for the passing of the vector to station 2 for three (3) successive periods each of two process delay times (2 pd) and station 2 failed to respond upon the third (3d) passage of the vector from station 1. However, in the example shown in FIG. 9, station 3 is also lost from the sequence so that it cannot respond upon the third (3d) attempt by station 1 to provide for the passing of the vector.

Since neither station 2 nor station 3 has responded to the attempt by station 1 to provide for the passing of the vector in three (3) successive attempts, station 1 now attempts to provide for the passing of the vector to an imaginary station which may be considered as station "0". Station 1 does this by setting the identification of the next station in the sequence to zero (0). Every time that station 1 attempts to pass the vector to station 0, the other stations in the sequence decrement their identification by one integer in a register associated with such station. This register is identified in FIG. 2A as "SNR", meaning "Station Number Relative".

The SNR register indicates the difference between the identification of the station providing for the passing of the vector anywhere and the identification of the station receiving this vector. For example, in the first attempt by station 1 to provide for the passing of the vector to station 0, station 4 decrements its Station Number Relative by one (1) integer from a value of 4−1=3 to a value of 3−1=2 so that its identification is now "2".

When station 1 has attempted two (2) successive times to provide for the passing of the vector to station 0, the identification of station 4 in the SNR register is now "1" to indicate that it is the station next to station 1 in the sequence. Station 4 now communicates with station 1 to indicate that station 1 should splice station 4 into the sequence as the next station in the sequence and should pass the vector to station 4. Station 1 then provides for the passing of the vector to station 4 and the sequence in FIG. 9 then constitutes stations 1, 4, 5, 6, 7 and 8.

FIG. 10E illustrates another example of the loss of a station and also indicates the time periods involved in the recovery of the system from the loss of such station. In FIG. 10E, station 9 provides for the passing of a vector to station 12, provides for the passing of a vector to station 12 a second time after the failure of station 12 to respond within a period of two process delay times (2 pd) and provides for a passing of a vector to station 12 a third time after a failure of station 12 to respond within a period of two process delay times (2 pd) to the third attempt by station 9. Station 9 then provides for the passing of a vector to imaginary station 0 to issue an invitation to the other stations in the sequence to become spliced to station 9.

FIG. 10F also illustrates the time sequence for the successive operations in the "Lost Station Recovery" mode. In the embodiment shown in FIG. 10F, station mm attempts to provide for the passing of the vector to the next station in the sequence. After two (2) process delay times, station mm again attempts to provide for the passing of the vector to such next station in the sequence. After two (2) additional process delay times (2 pd), station mm again attempts to provide for the passing of the vector to the next station in the sequence. This is indicated schematically in FIG. 10F. After an additional period of two process delay times (2 pd) with no response from any other stations, station mm attempts to provide for the passing of the vector to imaginary station 0.

After each attempt by station mm to provide for the passing of the vector to imaginary station 0 in FIG. 10F, the registers in the stations (other than station mm) still in the sequence are decremented by an integer. Assume that, of the stations still in the sequence, station nn is the station next to station mm. When the count in the SNR register in station nn has been decremented to a value of "1", station nn sends an invitation to station mm in FIG. 10F to splice station nn into the sequence. Upon receiving this invitation to splice, station mm splices station nn into the sequence and provides for the passing of the vector to station nn.

FIG. 10F also illustrates how the system of this invention operates when the system is just starting to operate in the "power-up" mode or when all of the stations have been temporarily or permanently lost from the system. Under such circumstances, all of the stations attempt simultaneously to provide for the passing of the vector to station 0. All of the stations have an individual process delay time (pd) different from those of the other stations. This will cause the station with the shortest process delay time (pd) to assume control over the operation of the system.

Assume that station 1 has the shortest process delay time (pd). This will cause station 1 to provide for the passing of the vector to station 0 before any other station. Station 2 will accordingly decrement its count relative to station 1 by an integer and to communicate a splice packet to station 1. Station 1 accordingly splices station 2 into the sequence. Station 2 now provides for the passing of the vector to imaginary station 0 and every station except stations 1 and 2 decrements its count by an integer. The count in station 3 accordingly becomes decremented to a value where station 3 sends a splice package to station 2 and station 2 splices station 3 into the sequence. This continues until all of the stations have been progressively spliced into the sequence.

As previously described, a designation of "pmi" (representing "Performance Master Indicator") in the "Packet Data" portion of a packet for a station indicates whether such station will be an active station in a sequence. As previously indicated, the stations are capable of operating in different modes such as a set-up mode or a performance mode. A designation of "pma" (representing "Performance Mode Active") in the "Packet Data" portion of a packet for a station indicates the hierarchy of the operational mode which is currently involved.

In the set-up mode, all of the stations participate in the sequence regardless of their "Performance Master Indicator" (pmi). In the Performance Mode, only the stations with pmi indications are included in the sequence. As shown in FIG. 6, not all of the stations in the set-up mode are necessarily included in the performance mode since the performance mode is at a higher level than the set-up mode.

Assume that the stations in a sequence are operating in the set-up mode. In order to ascend to the performance mode, any station in the set-up mode can communicate that the performance mode should be activated. However, in order to do this, such station has to pass a vector with the desired "pma" designation in the "Packet Data" portion of the vector packet. Such station can then convert the operation to the performance mode by including this value as the "pma" value in the next vector it transmits. The stations then operate in the performance mode.

For example, in FIG. 7, stations 1, 2, 3, 4, 5, 6, 7 and 8 are in the set-up mode (as indicated by solid wide lines between the stations) but only stations 1, 5 and 8 are in the performance mode (as indicated by broken lines between the stations). A register shown in FIG. 2A as "PNID" (meaning "Next performance Identification") is provided for each individual one of the stations in the performance mode to indicate the next station in the performance mode—i.e., the station to which each individual station provides for the passing of the vector in the performance mode.

When the stations (such as stations 1, 5 and 8) in FIG. 7 are operating in the performance mode, other individual stations with an occasional need to send information may include a pma designation in the "Packet Data" portion of a packet. This allows such individual stations to enter into the sequence of the performance mode when the stations in the performance mode have sequenced to a position where such individual stations can be spliced into the sequence. When such individual stations have completed the communication of information to another station, or other stations, in the sequence, they operate to splice themselves out of the sequence in the manner shown in FIG. 5 and discussed above.

In order for the stations (such as the stations 1, 5 and 8 in FIG. 7) to continue to operate in the performance mode in successive cycles of operation, one of the stations has to indicate on a positive basis in each such cycle that it desires to continue the operation of the sequence in the performance mode. One of the stations does this by communicating a pmi indication to the other stations in the sequence. If none of the stations in the sequence sends a pma communication in a cycle of operation, the sequence reverts to the set-up mode.

The system disclosed above has certain important advantages. These advantages provide the systems of this invention with a considerably enhanced flexibility in the operation of the system in comparison to the system of the prior art. For example, the system of this invention can adjust the stations in a sequence to splice stations into, or splice stations out of, the sequence without affecting the operation of the system. The system of this invention provides these station adjustments or flexibilities in such a way that the system continues to operate without any noticeable interruptions in the operation of the system. When the system is operating to generate data relating to music, this is important in insuring that the listener will continue to hear the music without any noticeable pause or interruption.

The adjustment in the operation of the system of this invention without affecting or interrupting the operation of the sequence may be seen from the following different examples:

1. Any station not in a sequence may splice itself into the sequence. Furthermore, this splicing occurs at a proper time in the sequence depending upon the position of the station in the sequence.
2. Any station may splice itself out of a sequence. Furthermore, such splicing occurs at a proper time in the sequence depending upon the position of the station in the sequence.
3. Any station may be spliced out of a sequence if it does not accept the vector from a previous station in the sequence within a predetermined time. Furthermore, such splicing occurs at a proper time in the sequence depending upon the position of the station in the sequence.

The system of this invention also has other important advantages. For example, it is able to provide a selective communication between stations. This may be seen from the following:

1. A station receiving the vector is able to communicate a data Packet to any of the other stations in a sequence.
2. A station receiving the vector is able to communicate a data packet to any selected group of stations in a sequence.

3. A station receiving the vector is able to broadcast a data packet to all of the other stations in a sequence.

In all of the above communncations, the operation of the system is not affected.

The system of this invention is also advantageous under conditions which would be considered as catastrophic in the systems of the prior art. For example, even when two (2) or more successive stations are lost from a sequence, the system of this invention is able to patch the system without affecting or interrupting the oeration of the system.

The system of this invention also follows the same procedure as discussed in the previous paragraph when power is first applied to the system. In this way, the system is able to become automatically operative when power is first applied to the system. Furthermore, the system is able to become operative in a minimal period of time and in a proper succession of stations under such circumstances.

The system of this invention is also able to become converted (or switched) automatically between different modes of operation without any noticeable interruption in the operation of the system. For example, the system is able to become converted from a set-up mode to a performance mode without any interruption in the operation of the system. The system is also able to operate in the performance mode for any desired period of time and to revert to the set-up mode whenever it is no longer desired to operate the system in the performance mode.

The program for operating the system of this invention is shown in Exhibit A, which is attached to this specification and is considered as forming a part of this specification. Applicant believes that a person of ordinary skill in the art will be able to understand this program without further explanation, particularly in view of the above description of the construction and operation of the system of this invention.

Although this invention has been disclosed and illustrated with reference to particular embodiments, the principles involved are susceptible for use in numerous other skilled in the art. The invention is, therefore, to be limited only as indicated by the scope of the appended claims.

```
MEDIALNK.ASM              PAGE 1  Thu Feb 22 10:27:11 1990

1: $DEFAULT PW=132
  2: ;************************************************************************
  3: ;
  4: ;     Project:    MidiTap
  5: ;
  6: ;     File:   MEDIALNK.ASM
  7: ;
  8: ;     Copyright (C) 1989 by Lone Wolf, Inc.
  9: ;     All rights reserved.
 10: ;
 11: ;     Author: Tim Tuttle (TT)
 12: ;
 13: ;     Description
 14: ;
 15: ;     The code module contains method and direct
 16: ;     function implementations, private macros, private data,
 17: ;     and method table over-ride functions. Method, override, and
 18: ;     object data structure definitions should be made in the
 19: ;     .INC file, located in INCLUDE for export to users
 20: ;     of this module.
 21: ;
 22: ;************************************************************************
 23: ;************************************************************************
 24: ;
 25: ;     Date\Author      Change comments
 26: ;     -----------      ---------------
 27: ;
 28: ;     TT  11/15/89     new back to back fiber echo
 29: ;     DJW 11/17/89     fixed MdiPPak/PakPBuilder interaction
 30: ;     TT  11/20/89     return correct status to remote on pool empty
 31: ;     DJW 11/26/89     rearrange tx fiber enable
 32: ;     TT  11/29/89     add pak sequence number to preamble
 33: ;     TT  12/1/89      delete LnkCBAUDValue and only allow 2 MHz on link
 34: ;     DJW 12/3/89      to VECTOR on LnkEOMTimeout
 35: ;     TT  12/5/89      disable DMA in Tx setup sequence
 36: ;     TT  12/14/89     just zero PakBuilder once
 37: ;     TT  12/14/89     check link idle at CT Timeout
 38: ;     TT  12/18/89     back to 7+2 PD on long timeout
 39: ;     TT  12/19/89     fix LnkPDA equate
 40: ;     TT  12/27/89     redo Group ID table search
 41: ;     TT  12/27/89     move Group ID Table routines to lnk
 42: ;     TT  12/27/89     add Group ID Table subroutines
 43: ;     TT  12/29/89     DEBUG CODE TO CHECK GROUP TABLE
 44: ;     TT  12/29/89     MALL
 45: ;     TT  12/29/89     queue broadcast or group after TxEOM
 46: ;     TT  1/8/90       after EOM timeout goto LnkRESP
 47: ;     TT  1/12/90      delete group tests
 48: ;     DJW 1/17/90      clear LID in Vect2
 49: ;     TT  1/22/90      clear SysNodeID if conflict detected
 50: ;     TT  1/24/90      setup configurable fiber modes
 51: ;     TT  1/25/90      move node id conflict reset code to task
 52: ;     TT  1/27/90      fix splicepak pointer
 53: ;     TT  1/27/90      move LnkSPLICE entry point
 54: ;     TT  1/27/90      move ctdelay in LnkRxSplice
 55: ;     TT  1/27/90      make sure vectors have sysnodeid set
 56: ;     TT  1/29/90      if DID=0 then stick with VECTOR
```

EXHIBIT A

```
MEDIALNK.ASM                    PAGE 2   Thu Feb 22 10:27:11 1990

57: ;         TT 1/29/90      check for SID<MID<DID and DID<SID<MID for splice
 58: ;         TT 1/29/90      delete vector table and add more NID comps
 59: ;         TT 1/30/90      redo jump table for Rx packets
 60: ;         TT 1/30/90      delete search thru Rx duscc fifo on RxEOM
 61: ;         TT 2/1/90       refix CTdelay in RxResponse
 62: ;         DJW 2/1/90      delete hub stub
 63: ;         TT 2/2/90       delete LnkResetFlag and add SysReset Flag and reZip
 64: ;         TT 2/2/90       delete page0.inc
 65: ;         TT 2/2/90       TxRxDisable speedup
 66: ;         TT 2/2/90       redo splice spd logic
 67: ;         TT 2/5/90       LnkActive on every vector Rxed
 68: ;         TT 2/5/90       begin spliceout logic
 69: ;         TT 2/6/90       LnkActive on vectEOM and Rx vector
 70: ;         TT 2/6/90       do not start link if in stand alone mode
 71: ;         TT 2/7/90       stay with VECTOR if DID = MID in VectEOM
 72: ;         TT 2/7/90       make sure last in ring checks for data
 73: ;         TT 2/9/90       reZip if SLAVE timeout or LID problem
 74: ;         TT 2/9/90       redo LID logic
 75: ;         rss 2/10/90     debug screen labels added
 76: ;         DJW 2/11/90     do not clear LID in VECT2 if LID ne NID
 77: ;
 78: ;*********************lastmod** DJW  2/17/90   17:57:22  *****************
 79:
 80: #define         MODULE  MEDIALNK
 81:
 82: #include        <sysmacs.inc>
 83: #include        <system.inc>
 84:
 85:         startModule MEDIALNK,   ; generates standard assembler directives
 86:                         ; Causes assembly of MEDIALNK.INC to also generate
 87:                         ; EEROM data for class initialization.
 88:
 89: #include        <MEDIALNK.inc>
 90:
 91: ;       include other module export files here for
 92: ;       those modules whose services you will be using
 93:
 94: #include        <sysreg.inc>
 95: #include        <task.inc>
 96: #include        <packet.inc>
 97: #include        <utils.inc>
 98: #include        <memory.inc>
 99: #include        <midiin.inc>
100: #include        <port.inc>
101: #include        <config.inc>
102:
103:
104:
105: *
106: *       DISABLE Tx AND Rx
107: *
108: TxRxDisable %macro
109:
110:         LDAA    LnkRxFiberMode                  ; fiber to remote reflect mode
111:         STAA    OUTCFG
112:
```

```
MEDIALNK.ASM              PAGE 3  Thu Feb 22 10:27:11 1990

113:          LDAA    #RxRes                  ; RESET Rx
114:          STAA    CCR+LinkA
115:
116:          CLRA
117:
118:          STAA    CCR+LinkA               ; RESET Tx
119:
120:          STAA    CBAUD                   ; DISABLE Tx AND Rx MANCHESTER
121:
122:          LDAA    #1                      ; ENABLE Rx DMA
123:          STAA    DmaPri
124:
125:          %endm
126:
127:
128: *
129: *    ENABLE Rx
130: *
131: RxEnable %macro
132:
133:          LDX     #LnkRxEOM
134:          STX     SysIRQEOM
135:
136:          ldaa    #$0D                    ; READY TO Rx REMOTE
137:          staa    IER+LinkA               ; ready for action
138:
139:          LDAA    #RxMan                  ; ENABLE Rx MANCHESTER
140:          STAA    CBAUD
141:
142:          LDAA    #RxEna                  ; ENABLE Rx
143:          STAA    CCR+LinkA
144:
145:          %endm
146:
147: *
148: *    CHECK LINK AND GRAB IF IDLE
149: *
150: IdleCheck %macro
151:          %gensym IdleCheck10
152:
153:          LDAB    #TxMan+RxMan            ; setup to ENABLE Tx AND Rx MANCHESTER
154:
155:          LDAA    ICTSR+LinkA             ; READ DUSCC CONTROL STATUS
156:          BITA    #$08                    ; DCD HI
157:          BEQ     IdleCheck10             ; NO - GRAB LINK
158:
159:          JMP     LnkDmaBusy              ; YES - WAIT TILL FRAME FINISHED
160:
161: IdleCheck10
162:
163:          LDAA    LnkTxFiberMode          ; fiber to Tx mode
164:          STAA    OUTCFG
165:
166:          STAB    CBAUD                   ; ENABLE Tx AND Rx Manchester
167:
168:          LDAA    #$02                    ; ENABLE Tx DMA
```

```
MEDIALNK.ASM              PAGE 4  Thu Feb 22 10:27:11 1990

169:        STAA    DmaPri
170:
171:
172:        %endm
173:
174:
175:
176: *
177: *      EXTRACT Rx STATUS FROM DUSCC FIFO AFTER EOM INTERRUPT
178: *
179: StatusCheck %macro
180:        %gensym  LnkEOMStatus
181:        %gensym  LnkEOMStatus10
182:        CTStop                              ; DISABLE CT
183: LnkEOMStatus
184:        LDAB    RSR+LinkA               ; READ DUSCC STATUS
185:        ANDB    #$42                    ; CHECK FOR ERRORS
186:        BNE     LnkEOMStatus10
187:        LDAA    RxFIFO+LinkA            ; EMPTY Rx DUSCC FIFO
188:        LDAA    GSR+LinkA               ; SEE IF MORE IN FIFO
189:        BITA    #ARx                    ; MORE IN FIFO?
190:        BNE     LnkEOMStatus            ; YES - EMPTY FIFO
191: LnkEOMStatus10
192:        %endm
193:
194:
195:
196: CollisionDebug %macro
197:        extern  RxErrorCount(page0)
198:        inc     RxErrorCount        ; DEBUG!!!!!
199:        extern  RxErrorStatus(page0)
200:        stab    RxErrorStatus
201:        %endm
202:
203:
204:
205: RxNewPak %macro
206: *
207: *      GET A Pak FROM THE PakPool AND SETUP Rx BACKUP BUFFER PARAMS
208: *
209:        %gensym RxNewPak10
210:        ldy     PakPoolHead             ; get next buffer pointer
211:        bne     RxNewPak10              ; pool not empty
212:
213:
214:        ldd     #$baff          ; DEBUG
215:        jsr     sysErr          ; DEBUG
216:
217:
218: RxNewPak10
219:        ldx     0,y                     ; thread to next buffer in pool
220:        stx     PakPoolHead             ; update pool head pointer
221:        dec     PakPoolCnt              ; count down pool level
222:        clr     0,y                     ; clear next pointer
223:        clr     1,y
224:        STY     LnkPRxTskBak            ; SAVE Rx Tsk POINTER
```

```
MEDIALNK.ASM              PAGE 5  Thu Feb 22 10:27:11 1990

225:
226:        LDX     PakPData,Y              ; EXTRACT DATA ADRS
227:        STX     LnkPRxDataBak           ; SAVE IN DIRECT ADRS FOR SPEED
228:        %endm
229:
230:
231: *
232: *      QUEUE PACKET IN TASK QUEUE
233: *
234: QuePak %macro
235:
236:        LDX     PakPQOUT                ; GET POINTER TO Tx Tsk
237:        LDX     0,X                     ; FROM Pak Que
238:        INC     PakPQOUT+1              ; DEQUE Tx Tsk
239:        INC     PakPQOUT+1
240:
241:        LDY     TskPTos,X               ; EXTRACT STACK POINTER
242:        STAA    TskStkA,Y               ; STATUS TO Tsk
243:
244: *
245: *      QUEUE Tsk IN TASK Q
246: *
247:        tskQAdd
248:
249:        LDAA    #LnkRetries             ; INIT RETRY COUNT
250:        STAA    LnkRetryCount
251:
252:        INC     LnkTxSequence           ; BUMP Tx SEQUENCE NUMBER
253:
254:        %endm
255:
256:
257: *
258: *      STOP COUNTER/TIMER
259: *
260:
261: CTStop %macro
262:        LDAA    #CTDis                  ; DISABLE SELF
263:        STAA    CCR+LinkA
264:        %endm
265:
266:
267:
268: *
269: *      CTDelay1  SETS 1 PDA DELAY TIMER
270: *
271: CTDelay1 %macro
272:
273:        LDAA    #CTClr                  ; CLEAR CT INTERRUPT FLAG
274:        STAA    ICTSR+LinkA
275:
276:        LDX     LnkDelay1               ; 1 PDA DELAY
277:        STX     CTPRH+LinkA
278:
279:        LDAA    #CTPre                  ; PRESET COUNTER TIMER
280:        STAA    LinkA+CCR
```

```
MEDIALNK.ASM              PAGE 6   Thu Feb 22 10:27:11 1990

281:
282:        LDAA    #CTEna                  ; ENABLE TIMER
283:        STAA    LinkA+CCR
284:
285:        %endm
286:
287:
288: *
289: *      CTDelay2  SETS 2 PDA DELAY TIMER
290: *
291: CTDelay2 %macro
292:
293:        LDAA    #CTClr                  ; CLEAR CT INTERRUPT FLAG
294:        STAA    ICTSR+LinkA
295:
296:        LDX     LnkDelay2               ; 2 PDA DELAY
297:        STX     CTPRH+LinkA
298:
299:        LDAA    #CTPre                  ; PRESET COUNTER TIMER
300:        STAA    LinkA+CCR
301:
302:        LDAA    #CTEna                  ; ENABLE TIMER
303:        STAA    LinkA+CCR
304:
305:        %endm
306:
307:
308:
309: *
310: *      CTDelay3  SETS 3 PDA DELAY TIMER
311: *
312: CTDelay3 %macro
313:
314:        LDAA    #CTClr                  ; CLEAR CT INTERRUPT FLAG
315:        STAA    ICTSR+LinkA
316:
317:        LDX     LnkDelay3               ; 3 PDA DELAY
318:        STX     CTPRH+LinkA
319:
320:        LDAA    #CTPre                  ; PRESET COUNTER TIMER
321:        STAA    LinkA+CCR
322:
323:        LDAA    #CTEna                  ; ENABLE TIMER
324:        STAA    LinkA+CCR
325:
326:        %endm
327:
328: *
329: *      CTDelay4  SETS 4 PDA DELAY TIMER
330: *
331: CTDelay4 %macro
332:
333:        LDAA    #CTClr                  ; CLEAR CT INTERRUPT FLAG
334:        STAA    ICTSR+LinkA
335:
336:        LDX     LnkDelay4               ; 4 PDA DELAY
```

```
MEDIALNK.ASM            PAGE 7  Thu Feb 22 10:27:11 1990

337:        STX     CTPRH+LinkA
338:
339:        LDAA    #CTPre                      ; PRESET COUNTER TIMER
340:        STAA    LinkA+CCR
341:
342:        LDAA    #CTEna                      ; ENABLE TIMER
343:        STAA    LinkA+CCR
344:
345:        %endm
346:
347:
348:
349: *
350: *      CTDelayLong SETS (7+2*NNR)*pda DELAY TIMER FROM LOOKUP TABLE
351: *
352: CTDelayLong %macro
353:
354:        LDAA    #CTClr                      ; CLEAR CT INTERRUPT FLAG
355:        STAA    ICTSR+LinkA
356:
357:        LDX     #LnkDelayTable              ; GET PDA FROM TABLE USING NNR
358:        LDAB    LnkNNR
359:        LSLB
360:
361:        ABX
362:        LDX     0,X                         ; EXTRACT PDA FROM TABLE
363:
364:        STX     CTPRH+LinkA
365:
366:        LDAA    #CTPre                      ; PRESET COUNTER TIMER
367:        STAA    LinkA+CCR
368:
369:        LDAA    #CTEna                      ; ENABLE TIMER
370:        STAA    LinkA+CCR
371:
372:        %endm
373:
374:
375:
376: TableIndex %macro  table,index
377: *
378: *      Index into table with index and return pointer in X
379: *
380:        ldx     #&table
381:        ldab    &index
382:        abx
383:
384:        %endm
385:
386:
387:
388:
389: #ifdef  LNK
390: $ALLPUBLIC
391: #endif
392:
```

```
MEDIALNK.ASM              PAGE 8  Thu Feb 22 10:27:11 1990

393: ; **** DJW 2/10/90
394: ;
395: ;
396:        seg    _CODE
397:
398: LnkVectorPakLab  db    'Vector', MEND
399:
400:
401:        DEFSEG  _LSTRINGS,CLASS=CODE
402:        SEG     _LSTRINGS
403:
404:        DW      LnkVectorPakLab
405:
406:        DEFSEG  _LVALUES,CLASS=CODE
407:        SEG     _LVALUES
408:
409:        DW      LnkVectorPak+1
410: ;
411: ;
412: ; **** DJW 2/10/90
413:
414: LnkRetries      EQU    -3              ; COUNT OF NO RESPONSE FROM DATA PACKET
415:
416: LnkNodeCount    EQU    16              ; COUNT OF LEGAL NODES IN SYSTEM
417:
418:
```

```
MEDIALNK.ASM              PAGE 9  Thu Feb 22 10:27:11 1990

419: ;***********************************************************************
420: ;      private un-initialized data
421: ;***********************************************************************
422:       seg      _BSS
423:
424: *
425: *     CT DELAY VALUES COMPUTED FROM PDA
426: *
427: LnkDelay1       DS      2                       ; 1 PDA
428: LnkDelay2       DS      2                       ; 2 PDA
429: LnkDelay3       DS      2                       ; 3 PDA
430: LnkDelay4       DS      2                       ; 4 PDA
431:
432: LnkDelayTable   DS      2*LnkNodeCount          ; LONG DELAY LOOKUP TABLE FOR 16 NODES
433:
434:
435: LnkPIDTable     DS      16                      ; PREV ID TABLE
436: LnkNIDTable     DS      16                      ; NEXT ID TABLE
437:
438:
439:
440: *
441: *     STATIC Tx VECTOR PACKET STRUCTURE
442: *
443:
444:
445:
446: LNK_VectorLth   EQU     7                       ; LENGTH OF VECTOR PACKET
447:
448: LnkVectorPak
449: LnkVecID        DS      1                       ; PACKET ID
450: LnkVecDID       DS      1                       ; DESTINATION ID
451: LnkVecSID       DS      1                       ; SOURCE ID
452: LnkPDA          DS      1                       ; ACTUAL PROCESSOR DELAY FACTOR
453: LnkPMA          DS      1                       ; LINK PMA
454: LnkPMI          DS      1                       ; LINK PMI
455: LnkLID          DS      1                       ; LINK LID
456:
457:
458: *
459: *     Rx PACKET INDEX OFFSETS
460: *
461: LNK_ID          EQU     PAK_HdrID               ; PACKET ID
462: LNK_DID         EQU     PAK_HdrDID              ; DESTINATION ID
463: LNK_SID         EQU     PAK_HdrSID              ; SOURCE ID
464: LNK_SEQ         EQU     PAK_HdrSEQ              ; PAK SEQUENCE NUMBER
465: LNK_PDA         EQU     LnkPDA-LnkVectorPak     ; ACTUAL PROCESSOR DELAY FACTOR
466: LNK_PMA         EQU     LnkPMA-LnkVectorPak     ; LINK PMA
467: LNK_PMI         EQU     LnkPMI-LnkVectorPak     ; LINK PMI
468: LNK_LID         EQU     LnkLID-LnkVectorPak     ; LINK LID
469:
470: *
471: *     Tx SPLICE PACKET
472: *
473: LNK_SpliceLth   EQU     4                       ; LENGTH OF SPLICE PACKET
474:
```

```
MEDIALNK.ASM            PAGE 10  Thu Feb 22 10:27:11 1990

475: LnkSplicePak
476:
477: LnkSplID          DS    1                          ; PACKET ID
478: LnkSplDID         DS    1                          ; DESTINATION ID
479: LnkSplSID         DS    1                          ; SOURCE (MY) ID
480: LnkSPD            DS    1                          ; SPLICE DATA
481:
482:
483: *
484: *        Rx SPLICE PACKET INDEX OFFSETS
485: *
486: LNK_SPD           EQU   LnkSPD-LnkSplicePak        ; splice data
487:
488:
489: *
490: *        Tx RESPONSE PACKET
491: *
492: LNK_ResponseLth   EQU   5                          ; LENGTH OF RESPONSE PACKET
493:
494: LnkResponsePak
495:
496: LnkResID          DS    1                          ; PACKET ID
497: LnkResDID         DS    1                          ; DESTINATION ID
498: LnkResSID         DS    1                          ; SOURCE (MY) ID
499: LnkResSEQ         DS    1                          ; SEQUENCE NUMBER OF DATA PACKET
500: LnkRSP            DS    1                          ; RESPONSE STATUS
501:
502:
503: *
504: *        Rx RESPONSE PACKET INDEX OFFSETS
505: *
506: LNK_RSP           EQU   LnkRSP-LnkResponsePak      ; response status
507:
508:
```

```
MEDIALNK.ASM          PAGE 11  Thu Feb 22 10:27:11 1990

509: ;********************************************************************
510: ;      class power-up initialization code (before tasks are running)
511: ;********************************************************************
512:        seg      _CODE
513:
514: MEDIALNK.init proc
515:
516:
517: *
518: *      FILL LnkGroupIDTable WITH FF's
519: *
520:        ldab     #LnkGroupIDLength*LnkGroupIDCount ; length of ID table entry
521:        LDX      #LnkGroupIDTable          ; SETUP TABLE SEARCH
522:        LDAA     #MEND
523: LnkGroupFill
524:        STAA     0,X
525:        INX
526:        DECB
527:        BNE      LnkGroupFill
528:
529:
530:
531: *
532: *      CONFIGURE DUSCC FOR FULL DUPLEX DMA
533: *
534:        LDY      #LinkA                    ; CONFIGURE LINK
535:        LDX      #iniBOPCfgTab             ; CONFIGURE TABLE ADRS
536:        JSR      utlDusccCfg               ; WRITE VALUES TO DUSCC
537:        CLR      IVR+LinkA                 ; SETUP DUSCC VECTOR
538:
539:        TxRxDisable                        ; make sure Manchesters are quiet
540:
541:        CTStop                             ; reset Counter/Timer
542:
543: *
544: *      NOW CONFIGURE DMA CHANNEL 1 FOR Tx OPERATION
545: *
546:        LDAA     #%00000101                ; READ, CYCLE STEAL
547:        STAA     DmaStat1                  ; STATUS CHANNEL 1
548:
549: *
550: *      NOW CONFIGURE DMA CHANNEL 0 FOR Rx OPERATION
551: *
552:        LDAA     #%00000100                ; WRITE, CYCLE STEAL
553:        STAA     DmaStat0                  ; STATUS CHANNEL 0
554:
555:        LDAA     #%00000000
556:        STAA     DmaInt                    ; INTERRUPT PRIORITY
557:
558:        LDAA     #08                       ; CONFIGURE CONTROL REGS
559:        STAA     DmaDCn                    ; DATA CHAIN
560:
561:        LDAA     #%00000001                ; ENABLE CHANNEL 0 Rx
562:        STAA     DmaPri
563:
564:        rts
```

```
MEDIALNK.ASM                    PAGE 12  Thu Feb 22 10:27:11 1990
565:
566: *
567: *       LINK DUSCC CONFIGURATION TABLE
568: *
569: iniBOPCfgTab
570:        FCB     $00,PCR
571:        FCB     $00,CMR1                ; BOP PRIMARY MODE 8BIT ADR 8B CTL
572:        FCB     $1D,CMR2                ; FULL DUPLEX DMA
573:        FCB     $03,TPR                 ; 1 STOP BIT, 8 DATA BITS
574:        FCB     $80,TTR                 ; TX=EXT CLK X1
575:        FCB     $03,RPR                 ; 8 BIT RX CHAR
576:        FCB     $00,RTR                 ; RX=EXT CLK X1
577:        FCB     $00,OMR
578:        FCB     $8A,CTCR                ; SETUP COUNTER TIMER FOR PDA
579:        FCB     $00,CTPRH               ; SET PRESCALE TO 0
580:        FCB     $FF,CTPRL               ; SCALE TO MAX
581:        FCB     0,-1                    ; END OF TABLE
582:
583: MEDIALNK.init endproc
584:
585:
586:
587:
588:
589:
590:
591:
```

```
MEDIALNK.ASM              PAGE 13  Thu Feb 22 10:27:11 1990

592: ;*********************************************************************
593: ;     class start-up task code
594: ;*********************************************************************
595:
596: MEDIALNK.task proc
597:
598:         tst     CpuRxFiberMode          ; in stand alone mode?
599:         bpl     lnkTask10               ; no - start link
600:
601:         RTS                             ; yes - do not start link
602:
603: lnkTask10
604:
605:         SEI                             ; DO NOT LET LINK START TILL INIT DONE
606:
607:
608: *
609: *       SETUP STATIC LINK PACKETS
610: *
611:         LDAA    SysNodeID               ; MID = SYSNODEID
612:         STAA    LnkNNR                  ; INITIALIZE NNR
613: *
614: *       VECTOR PAK INIT
615: *
616:
617:         STAA    LNK_SID+LnkVectorPak    ; source (my) ID
618:
619:         LDAB    #LNK_VectorID           ; PACKET ID
620:         STAB    LNK_ID+LnkVectorPak
621:
622: *
623: *       SPLICE PAK INIT
624: *
625:         STAA    LNK_SID+LnkSplicePak    ; source (my) ID
626:
627:         LDAB    #LNK_SpliceID           ; SPLICE ID
628:         STAB    LNK_ID+LnkSplicePak
629:
630: *
631: *       RESPONSE PAK INIT
632: *
633:         STAA    LNK_SID+LnkResponsePak  ; source (my) ID
634:
635:         LDAB    #LNK_ResponseID         ; RESPONSE ID
636:         STAB    LNK_ID+LnkResponsePak
637:
638:         LDX     LnkPRxTsk               ; GOT A Pak ALREADY?
639:         BNE     lnkTaskIni10            ; YES - USE IT AGAIN
640:
641:         RxNewPak                        ; GET BACKUP Pak
642:
643:         STY     LnkPRxTsk               ; MOVE TO  PRIMARY POINTERS
644:         STX     LnkPRxData
645:
646:         RxNewPak                        ; GET BACKUP Pak
647:
```

```
MEDIALNK.ASM              PAGE 14  Thu Feb 22 10:27:11 1990

648: LnkTaskIni10
649:
650:        LDAA    #LnkRetries              ; INIT RETRY COUNT
651:        STAA    LnkRetryCount
652:
653: *
654: *      INITIALIZE Tx AND Rx SEQUENCE NUMBERS
655: *
656:        LDD     #$00FF
657:        STD     LnkTxSequence
658:
659: *
660: *      INITIALIZE VECTOR TIMER
661: *
662:        STAB    LnkVectorTimer
663:
664: *
665: *      enable DUSCC interrupts
666: *
667:        LDAA    #$37                     ; SETUP INTERRUPTS - AND ENABLE COMPORT
668:
669:        STAA    ICR+LinkA
670:
671:        CTDelayLong                      ; START LONG TIMER
672:
673:        LDD     #PAK_BufLth              ; SETUP Rx DMA REGISTERS
674:        STD     DmaCh0Cnt
675:
676:        LDX     LnkPRxData
677:        STX     DmaCh0Data
678:
679:        RxEnable                         ; enable Rx DUSCC and Manchester
680:
681:        CLI
682:
683: *
684: *      COMPUTE PDA VALUES FROM PD
685: *
686:
687:        public  MEDIALNK.PDA
688:
689: MEDIALNK.PDA
690:
691:        CLRA
692:        LDAB    LnkPDA
693:
694:        STD     LnkDelay1
695:
696:        ADDD    LnkDelay1
697:        STD     LnkDelay2
698:
699:        ADDD    LnkDelay1
700:        STD     LnkDelay3
701:
702:        ADDD    LnkDelay1
703:        STD     LnkDelay4
```

```
MEDIALNK.ASM                PAGE 15  Thu Feb 22 10:27:11 1990
704:
705:
706: *
707: *       NOW DO DELAY TABLE
708: *
709:        ADDD    LnkDelay3               ; GET 7 TIMES PD
710:
711:        LDX     #LnkDelayTable
712:        LDY     #LnkNodeCount           ; DO TABLE FOR 16 NODES NOW
713:
714: LnkPDAComp10
715:        STD     0,X
716:        ADDD    LnkDelay2
717:        INX
718:        INX
719:        DEY
720:        BNE     LnkPDAComp10
721:
722:        rts
723:
724: MEDIALNK.task endproc
725:
```

```
MEDIALNK.ASM              PAGE 16  Thu Feb 22 10:27:11 1990

726: ;**********************************************************************
727: ;      class method and private function code
728: ;**********************************************************************
729:
730:
```

```
MEDIALNK.ASM              PAGE 17  Thu Feb 22 10:27:11 1990

731: ;*********************************************************************
732: ;      superclass virtual method over-ride functions
733: ;*********************************************************************
734:
```

```
MEDIALNK.ASM          PAGE 18  Thu Feb 22 10:27:11 1990

735: ;************************************************************
736: ;        START UP CODE TABLE ENTRIES
737: ;************************************************************
738:
739:        SEG     _INIT_CODE
740:        DW      MEDIALNK.init
741:
742:
743: ************************************************************
744: *
745: *      MEDIALINK PROTOCOL HANDLER
746: *
747: ************************************************************
748:
749:              SEG     _CODE
750:
751: ************************************************************
752: *
753: *      LINK TIMER TIMEOUT EVENT
754: *
755: ************************************************************
756:
757:
758: *********************CT TIMEOUT*****************************
759: *
760: *      STATE IS RESP.  NO RESPONSE FROM REMOTE TO DATA PACKET.
761: *      ABORT PACKET AND CHANGE STATE TO VECTOR
762: *
763: ************************************************************
764:
765: lnkRESP
766:
767:        INC     LnkRetryCount           ; TRY FOR RESPONSE AGAIN
768:        BNE     lnkVECTOR
769:
770:        extern  TxDataTOCount(page0)
771:        inc     TxDataTOCount           ; DEBUG !!! COUNT TimeOut FRAMES
772:
773:        LDAA    #RET_TIMEOUT            ; RETURN TIMEOUT STATUS TO CALLER
774:
775: *
776: *      PUT LINK STATUS IN Tsk StkA
777: *
778:
779:        QuePak                          ; QUEUE PACKET IN TASK QUEUE
780:
781: *
782: *      CHANGE TIMER TO AWAIT VECTOR
783: *
784:        LDX     #lnkVECTOR
785:        STX     SysIRQCT
786:
787:
788:
789: *********************CT TIMEOUT*****************************
790: *
```

MEDIALNK.ASM           PAGE 19  Thu Feb 22 10:27:11 1990

```
791: *      STATE IS VECTOR, SPLICE or UPLEVEL
792: *              CHECK FOR DATA TO Tx
793: *
794: ****************************************************************
795:
796: LnkVECTOR
797: *STUB LnkSPLICE
798: LnkUPLEVEL
799:
800:        IdleCheck                       ; check link for idle
801:
802:        LDX     PakPQOUT                ; CHECK PACKET QUE FOR ENTRIES
803:        CPX     PakPQIN
804:        BNE     LnkDataReady
805:        JMP     LnkNoData               ; QUE IS EMPTY - Tx SPLICE OR VECTOR
806:
807: LnkDataReady
808:
809:        LDX     0,X                     ; EXTRACT Tsk FROM QUE
810:        LDY     PakPBuilder,X           ; **** DJW ****
811:        beq     LnkDataReady10
812:        LDD     #0
813:        STD     0,Y                     ; **** DJW **** SIGNAL MIDI THAT PACKET IS GONE **** DJW ****
814:        STD     PakPBuilder,X           ; JUST ZERO PakBuilder ONCE
815:
816:
817: *
818: *      SETUP DMA WRITE PARAMETERS
819: *
820: LnkDataReady10
821:        LDAB    #PAK_BufLth             ; COMPUTE BYTE COUNT FROM BYTES LEFT
822:
823:        SUBB    PakCount,X              ; PACKET LENGTH
824:        LDY     PakPData,X              ; PAK START
825:
826: *
827: *      PUT Tx SEQUENCE IN PAK PREAMBLE
828: *
829:        LDAA    LnkTxSequence
830:        STAA    LNK_SEQ,Y
831:
832: *
833: *      SETUP EOM STATE FOR DATA OR BROADCAST FRAME
834: *
835:
836:        LDX     #LnkTxDataEOM           ; PRESET FOR DATA FRAME
837:        LDAA    0,Y                     ; GET ID FROM PACKET
838:        CMPA    #LNK_DataID             ; DATA FRAME?
839:        BEQ     LnkDmaWriteState        ; YES
840:        LDX     #LnkGroupEOM            ; BROADCAST GROUP OR ALL
841:
842: *
843: *      CONFIGURE DMA, MANCHESTER AND DUSCC FOR Tx
844: *              B = DMA BYTE COUNT
845: *              Y = DMA DATA ADRS
846: *              X = EOM STATE ADDRESS
```

```
MEDIALNK.ASM              PAGE 20  Thu Feb 22 10:27:11 1990

847: *
848:
849: LnkDmaWriteState
850:
851:       STX       SysIRQEOM              ; SET EOM VECTOR
852:
853: LnkDmaWrite
854:
855: *
856: *     SETUP Tx DMA REGISTERS
857: *
858:       STY       DmaCh1Data             ; DATA ADRS TO DMA
859:
860:       CLRA
861:       STD       DmaCh1Cnt              ; STORE COUNT IN DMA
862:
863: *
864: *     SET CT PRELOAD TO 4 TIMES FRAME LENGTH
865: *
866:
867:       LSLD
868:       LSLD
869:       STD       CTPRH+LinkA
870:
871:       ldaa      #$02                   ; INTERRUPT ON TRAILING FLAG
872:       staa      IER+LinkA              ; ready for action
873:
874:       LDAA      #SOM                   ; SOM
875:       STAA      CCR+LinkA
876:
877:       LDAA      #TxEna                 ; ENABLE Tx
878:       STAA      CCR+LinkA
879:
880:       LDAA      #$FF                   ; RESET END FLAG BIT FOR INTERRUPT
881:       STAA      RSR+LinkA
882:
883:       LDAA      #CTClr                 ; CLEAR CT INTERRUPT FLAG
884:       STAA      ICTSR+LinkA
885:
886:       LDAA      #CTPre                 ; PRESET COUNTER TIMER
887:       STAA      LinkA+CCR
888:
889:       LDAA      #CTEna                 ; ENABLE TIMER
890:       STAA      LinkA+CCR
891:
892:       ldx       #LnkEOMTimeOut         ; missed EOM vector
893:       stx       SysIRQCT
894:
895:       RTI
896:
897:
898:
899:
900: LnkDmaBusy
901:
902:       CTDelayLong
```

```
MEDIALNK.ASM              PAGE 21  Thu Feb 22 10:27:11 1990

903:
904:        LDX     #lnkSLAVE
905:        STX     SysIRQCT
906:
907:        extern  lnkBusyCount(page0)
908:        inc     lnkBusyCount            ; DEBUG count times through
909:
910:        RTI
911:
912:
913:
914:
915:
916: lnkEOMTimeOut
917:
918:        TxRxDisable
919:
920:        CTDelayLong
921:
922:        LDY     #lnkRESP
923:
924:        LDX     SysIRQEOM               ; SET EOM VECTOR
925:        CPX     #lnkTxDataEOM           ; PRESET FOR DATA FRAME
926:        BEQ     lnkEOMTimeOut10
927:        CPX     #lnkGroupEOM            ; BROADCAST GROUP OR ALL
928:        BEQ     lnkEOMTimeOut10
929:
930:        LDY     #lnkVECTOR
931:
932: lnkEOMTimeOut10
933:        STY     SysIRQCT
934:
935:        RxEnable
936:
937:        RTI
938:
939:
940: ***********************CT TIMEOUT**********************************
941: *
942: *      STATE IS SLAVE.
943: *
944: ******************************************************************
945:
946: lnkSLAVE
947:
948:        IdleCheck                       ; check link for idle
949:
950:        bset    SysResetFlag,ReZipBit   ; signal ring to reZip
951:
952: *
953: *      DATA QUE IS EMPTY - SETUP SPLICE OR VECTOR FOR Tx
954: *
955:
956: lnkNoData
957:
958:        LDD     LnkMyPma                ; SEE IF MYPMA < PMA
```

```
MEDIALNK.ASM              PAGE 22  Thu Feb 22 10:27:11 1990

959:        CMPA     LnkPMA
 960:        BLT      LnkTxSplice              ; LESS THAN - SEND SPLICE
 961:
 962: *
 963: *      SEND VECTOR PACKET
 964: *
 965:        STD      LnkPMA
 966:
 967:        TableIndex LnkNIDTable,LnkPMA
 968:
 969:        ldaa     0,X                      ; NID(pma) = 0 ?
 970:        bne      LnkTxVect05              ; no
 971:
 972:        ldab     LnkVecSID
 973:        cmpb     SysNodeID
 974:        beq      LnkTxVect05
 975:        stab     0,x
 976:        tba
 977:
 978: LnkTxVect05
 979:
 980:        LDAB     SysNodeID                ; SETUP SID = ME
 981:        STD      LnkVecDID                ; VECTOR DID = NID
 982:
 983: *
 984: *      check Lock ID flag for LID request
 985: *
 986:        ldx      LnkLIDActiveTsk          ; my LID active?
 987:        beq      LnkTxVect07              ; no - check for LID service
 988:        cmpb     LnkLID                   ; see if LID = MID
 989:        beq      LnkTxVect07              ; LID ok
 990:        bset     SysResetFlag,ReZipBit    ; signal ring to reZip
 991:        stab     LnkLID                   ; regain LID
 992:
 993: LnkTxVect07
 994:
 995:        tst      LnkLIDFlag               ; need lock service?
 996:        beq      LnkTxVect20              ; no - done
 997:        bmi      LnkTxVect10              ; do clear LID
 998:        tst      LnkLID                   ; LID free?
 999:        bne      LnkTxVect20              ; no - wait till free
1000:        stab     LnkLID                   ; yes - grab LID
1001:        bra      LnkTxVect20              ; done
1002:
1003: LnkTxVect10
1004:
1005:        ldd      #0
1006:        std      LnkLIDActiveTsk          ; free active task
1007:        staa     LnkLID                   ; take LID off system
1008:        staa     LnkLIDFlag               ; clear release flag
1009:
1010: LnkTxVect20
1011:
1012:        LDY      #LnkVectorPak            ; POINTER TO STATIC VECTOR PACKET
1013:        LDAB     #LNK_VectorLth           ; LENGTH OF VECTOR PACKET
1014:
```

```
MEDIALNK.ASM              PAGE 23  Thu Feb 22 10:27:11 1990

1015:        LDX      #LnkVectEOM              ; SET EOM DATA TYPE TO SPLICE OR VECTOR
1016:
1017:        JMP      lnkDmaWriteState         ; SETUP DMA FOR WRITE
1018:
1019:
1020: *
1021: *      SEND SPLICE PACKET
1022: *
1023:
1024: lnkSPLICE
1025:
1026:        IdleCheck                         ; check link for idle
1027:
1028: lnkTxSplice
1029:
1030:        ldab     LnkVecSID
1031:        stab     LnkSplDID
1032:
1033:        LDAB     #LNK_SpliceLth           ; LENGTH OF VECTOR PACKET
1034:
1035:        LDX      #lnkVectEOM              ; SET EOM DATA TYPE TO SPLICE OR VECTOR
1036:
1037:        LDY      #LnkSplicePak            ; POINTER TO STATIC VECTOR PACKET
1038:
1039:        JMP      lnkDmaWriteState         ; SETUP DMA FOR WRITE
1040:
1041:
1042:
1043:
1044:
1045: ***********************CT TIMEOUT********************************
1046: *
1047: *      STATE IS TxRESP.  SEND RESPONSE
1048: *
1049: *****************************************************************
1050:
1051: lnkTxRESP
1052:
1053:        IdleCheck                         ; check link for idle
1054:
1055: *
1056: *      SETUP DMA PARAMS FOR RESPONSE PACKET
1057: *
1058:
1059:        LDY      #LnkResponsePak          ; POINTER TO STATIC PACKET
1060:        LDAB     #LNK_ResponseLth         ; STATIC PACKET LENGTH
1061:
1062:        LDX      #lnkTxRESPEOM
1063:
1064:        JMP      lnkDmaWriteState         ; SETUP DMA FOR WRITE
1065:
1066:
1067:
1068:
1069:
1070: ***********************CT TIMEOUT********************************
```

```
MEDIALNK.ASM              PAGE 24  Thu Feb 22 10:27:11 1990

1071: *
1072: *     STATE IS VECT1.  SEND VECTOR PACKET
1073: *
1074: ***********************************************************
1075:
1076: LnkVECT1
1077:
1078:         IdleCheck                       ; check link for idle
1079:
1080:         LDY     #LnkVectorPak           ; POINTER TO STATIC VECTOR PACKET
1081:
1082:         TableIndex LnkNIDTable,LnkPMA
1083:
1084:         ldab    0,X
1085:         STAB    LnkVecDID               ; VECTOR DID = NID
1086:
1087:         LDAA    SysNodeID               ; SETUP SID = ME
1088:         STAA    LnkVecSID
1089:
1090:         LDAB    #LNK_VectorLth          ; LENGTH OF VECTOR PACKET
1091:
1092:         LDX     #LnkVect1EOM
1093:
1094:         JMP     LnkDmaWriteState        ; SETUP DMA FOR WRITE
1095:
1096:
1097:
1098:
1099: ************************CT TIMEOUT*************************
1100: *
1101: *     STATE IS VECT2.
1102: *
1103: ***********************************************************
1104:
1105: LnkVECT2
1106:
1107:         IdleCheck                       ; check link for idle
1108:
1109:         LDY     #LnkVectorPak           ; POINTER TO STATIC VECTOR PACKET
1110:
1111:         TableIndex LnkNIDTable,LnkPMA
1112:
1113:         ldab    0,X
1114:         STAB    LnkVecDID               ; VECTOR DID = NID
1115:
1116:         cmpb    LnkLID                  ; LID belong to lost node?
1117:         bne     LnkVECT210              ; no
1118:
1119:         clr     LnkLID                  ; yes - release LID
1120:
1121: LnkVECT210
1122:
1123:         LDAA    SysNodeID               ; SETUP SID = ME
1124:         STAA    LnkVecSID
1125:
1126:         LDAB    #LNK_VectorLth          ; LENGTH OF VECTOR PACKET
```

```
MEDIALNK.ASM              PAGE 25  Thu Feb 22 10:27:11 1990

1127:
1128:          LDX      #lnkVect2EOM
1129:
1130:
1131:          JMP      lnkDmaWriteState          ; SETUP DMA FOR WRITE
1132:
1133:
1134:
1135:
1136:
1137:
1138:
1139:
1140: *************************EOM*******************************
1141: *
1142: *   END OF MESSAGE (EOM) INTERRUPT ENTRY POINT
1143: *        EOM STATE IS PRESET TO JUMP TO SPECIFIC Tx Pak TYPE
1144: *
1145: *************************EOM*******************************
1146:
1147:
1148:
1149:
1150: *************************EOM*******************************
1151: *
1152: *   Tx EOM FROM DATA PACKET
1153: *
1154: *************************EOM*******************************
1155:
1156: lnkTxDataEOM
1157:
1158:          StatusCheck                        ; READ RSR STATUS FROM DUSCC RxFIFO
1159:
1160:          TxRxDisable
1161:
1162:          TSTB                               ; check for Tx collision
1163:          beq      lnkTxDataEOM10            ; packet OK
1164:
1165:          bra      lnkCollision              ; err in Tx - start recovery
1166: *
1167: *   Data Tx OK - prepare for Rx
1168: *
1169: lnkTxDataEOM10
1170:
1171:          RxEnable
1172:
1173:          CTDelay4
1174:
1175:          LDX      #lnkRESP                  ; RESTART WITH 4 PDA DELAY AND RESP = CT STATE
1176:          STX      SysIRQCT
1177:
1178:          RTI
1179:
1180: *
1181: *   Link Collision
1182: *
```

```
MEDIALNK.ASM                    PAGE 26  Thu Feb 22 10:27:11 1990
1183: lnkCollision
1184:
1185:        CollisionDebug       ; DEBUG
1186:
1187:        ldx     #LnkUPLEVEL                      ; see if CT State = UPLEVEL or SPLICE
1188:        cpx     SysIRQCT
1189:        beq     lnkCollision10
1190:        ldx     #LnkSPLICE
1191:        cpx     SysIRQCT
1192:        beq     lnkCollision10
1193:
1194: *
1195: *      not UPLEVEL or SPLICE so set CT State to VECTOR
1196: *
1197:        RxEnable
1198:
1199:        CTDelay1
1200:
1201:        LDX     #LnkVECTOR
1202:        STX     SysIRQCT
1203:
1204:        RTI
1205:
1206:
1207:
1208: lnkCollision10
1209:        ldaa    LnkNNR
1210:        staa    LnkPCNT
1211:
1212:        RxEnable
1213:
1214:        CTDelayLong
1215:
1216:        LDX     #LnkSLAVE
1217:        STX     SysIRQCT
1218:
1219:        RTI
1220:
1221:
1222: *******************************EOM*********************************************
1223: *
1224: *      Tx EOM for Group or Broadcast All
1225: *
1226: *******************************************************************************
1227:
1228: lnkGroupEOM
1229:
1230:        StatusCheck                              ; READ RSR STATUS FROM DUSCC RxFIFO
1231:
1232:        TxRxDisable
1233:
1234:        TSTB                                     ; check for Tx collision
1235:        BEQ     lnkGroupEOM10
1236:
1237:        JMP     lnkCollision                     ; err in Tx - start recovery
1238:
```

```
MEDIALNK.ASM              PAGE 27  Thu Feb 22 10:27:11 1990

1239: *
1240: *       Data Tx OK - prepare for Rx
1241: *
1242: lnkGroupEOM10
1243:
1244:         RxEnable
1245:
1246:         CTDelay2
1247:
1248:         extern  TxDataCount(page0)
1249:         inc     TxDataCount              ; DEBUG !!! COUNT Tx FRAMES
1250:
1251:         ldaa    #RET_OK                  ; RETURN OK STATUS TO SENDER
1252:         QuePak                           ; QUEUE PACKET IN TASK QUEUE
1253:
1254:         LDX     #lnkVECTOR
1255:         STX     SysIRQCT
1256:
1257:         RTI
1258:
1259:
1260: *******************************EOM*******************************************
1261: *
1262: *       TxEOM from Splice or Vector Packet
1263: *
1264: *****************************************************************************
1265:
1266: lnkVectEOM
1267:
1268:         StatusCheck                      ; READ RSR STATUS FROM DUSCC RxFIFO
1269:
1270:         TxRxDisable
1271:
1272:         TSTB                             ; check for Tx collision
1273:         beq     lnkVectEOM10
1274:
1275:         jmp     lnkCollision             ; err in Tx - start recovery
1276: *
1277: *       Data Tx OK - prepare for Rx
1278: *
1279: lnkVectEOM10
1280:
1281:         RxEnable
1282:
1283:         CTDelay4
1284:
1285:         ldab    #$ff
1286:         STAB    LnkActive                ; keep alive orange led
1287:
1288:         LDX     #lnkVECTOR
1289:
1290:         ldaa    LnkVecDID                ; if DID = 0 then stick with VECTOR
1291:         beq     lnkVectEOM20
1292:
1293:         cmpa    SysNodeID                ; am I last ring survivor?
1294:         beq     lnkVectEOM20             ; yes - stick with VECTOR
```

```
MEDIALNK.ASM              PAGE 28  Thu Feb 22 10:27:11 1990

1295:
1296:          LDX      #lnkVECT1
1297:
1298: lnkVectEOM20
1299:
1300:          STX      SysIRQCT
1301:
1302:          RTI
1303:
1304:
1305: ********************************EOM********************************************
1306: *
1307: *      Tx EOM FROM TxRESP
1308: *
1309: ********************************************************************************
1310:
1311: lnkTxRESPEOM
1312:
1313:          StatusCheck                     ; READ RSR STATUS FROM DUSCC RxFIFO
1314:
1315:          TxRxDisable
1316:
1317:          TSTB                            ; check for Tx collision
1318:          beq      lnkTxRESPEOM10         ; packet OK
1319:
1320:          bra      lnkTxRESPColsn         ; err in Tx - start recovery
1321:
1322: *
1323: *      Data Tx OK - prepare for Rx
1324: *
1325: lnkTxRESPEOM10
1326:
1327:          RxEnable
1328:
1329:          CTDelayLong
1330:
1331:          LDX      #lnkSLAVE
1332:          STX      SysIRQCT
1333:
1334:          RTI
1335:
1336:
1337:
1338: *
1339: *      collision during TxRESP
1340: *
1341: lnkTxRESPColsn
1342:
1343:          CollisionDebug    ; DEBUG
1344:
1345:          RxEnable
1346:
1347:          CTDelay1
1348:
1349:          RTI
1350:
```

```
MEDIALNK.ASM          PAGE 29  Thu Feb 22 10:27:11 1990

1351:
1352:
1353: ************************EOM************************************
1354: *
1355: *     Tx EOM from VECT1
1356: *
1357: ****************************************************************
1358:
1359: LnkVect1EOM
1360:
1361:        StatusCheck                ; READ RSR STATUS FROM DUSCC RxFIFO
1362:
1363:        TxRxDisable
1364:
1365:        TSTB                       ; check for Tx collision
1366:        beq     LnkVect1EOM10      ; packet OK
1367:
1368:        bra     LnkVectColsn       ; err in Tx - start recovery
1369:
1370: *
1371: *     Data Tx OK - prepare for Rx
1372: *
1373: LnkVect1EOM10
1374:
1375:        RxEnable
1376:
1377:        CTDelay4
1378:
1379:
1380:        LDX     #LnkVECT2
1381:        STX     SysIRQCT
1382:
1383:        RTI
1384:
1385:
1386:
1387: *
1388: *     collision during VECT1 or VECT2 Tx
1389: *
1390: LnkVectColsn
1391:
1392:        CollisionDebug      ; DEBUG
1393:
1394:        RxEnable
1395:
1396:        CTDelay1
1397:
1398:        RTI
1399:
1400:
1401:
1402: ************************EOM************************************
1403: *
1404: *     Tx EOM from VECT2
1405: *
1406: ****************************************************************
```

```
MEDIALNK.ASM            PAGE 30  Thu Feb 22 10:27:11 1990

1407:
1408: lnkVect2EOM
1409:
1410:       StatusCheck                     ; READ RSR STATUS FROM DUSCC RxFIFO
1411:
1412:       TxRxDisable
1413:
1414:       TSTB                            ; check for Tx collision
1415:       beq     lnkVect2EOM10
1416:
1417:       jmp     lnkVectColsn            ; err in Tx - start recovery
1418:
1419: *
1420: *     Data Tx OK - prepare for Rx
1421: *
1422: lnkVect2EOM10
1423:
1424:       TableIndex LnkNIDTable,LnkPMA
1425:
1426:       clr     0,x                     ; zero NID(pma)
1427:
1428:       bset    SysResetFlag,ReZipBit   ; signal ring to reZip
1429:
1430:       RxEnable
1431:
1432:       CTDelay4
1433:
1434:       LDX     #LnkVECTOR
1435:       STX     SysIRQCT
1436:
1437:       RTI
1438:
1439:
1440: *************************************EOM**************************************
1441: *************************************EOM**************************************
1442: *
1443: *     Rx EOM on Packet from Link
1444: *
1445: *************************************EOM**************************************
1446: *************************************EOM**************************************
1447:
1448: lnkRxEOM
1449:
1450:       CTStop
1451:
1452:       LDAB    RSR+LinkA
1453:
1454:       TxRxDisable
1455:
1456:       ANDB    #$72                    ; check for Tx collision
1457:       beq     lnkRxEOM10              ; no collision
1458:
1459: *
1460: *     Collision detected in Rx from Remote - restart Rx  and ignore Frame
1461: *
1462: lnkRxEOMErr
```

```
MEDIALNK.ASM              PAGE 31  Thu Feb 22 10:27:11 1990

1463:
1464:         CollisionDebug
1465:
1466:         LDD      #PAK_BufLth              ; SETUP RxDMA LENGTH REGISTER
1467:         STD      DmAChOCnt
1468:
1469:         LDD      LnkPRxData
1470:         STD      DmaCh0Data
1471:
1472:         RxEnable                          ; RESTART Rx
1473:
1474:         JMP      LnkRxRestart
1475:
1476:
1477: *
1478: *       Rxed A GOOD PACKET - SWITCH BUFFERS AND REENABLE Rx
1479: *
1480:
1481: LnkRxEOM10
1482:
1483:         LDX      LnkPRxTsk                ; SWITCH Tsk POINTERS
1484:
1485:         LDAB     DmaCh0Cnt+1              ; PUT BYTES LEFT IN Tsk
1486:
1487:         STAB     PakCount,X
1488:         LDD      #PAK_BufLth              ; SETUP RxDMA LENGTH REGISTER
1489:         STD      DmAChOCnt
1490:
1491:         LDD      LnkPRxTskBak
1492:         STX      LnkPRxTskBak
1493:         STD      LnkPRxTsk
1494:
1495:         LDD      LnkPRxData               ; SWITCH Data POINTERS
1496:         LDX      LnkPRxDataBak
1497:         STD      LnkPRxDataBak
1498:         STX      LnkPRxData
1499:         STX      DmaCh0Data
1500:
1501:         RxEnable                          ; RESTART Rx
1502:
1503:         LDX      LnkPRxDataBak
1504:
1505:         ldab     LNK_ID,X                 ; extract packet ID
1506:         BPL      LnkRxGroup               ; THIS IS A GROUP - CHECK GROUP TABLE
1507:
1508:         ldy      #LnkPakIDTable           ; setup jump based on pak ID
1509:         andb     #$0f                     ; mask top bits
1510:         lslb                              ; index times 2
1511:         aby
1512:         ldab     LNK_DID,X                ; setup DID in reg B
1513:         ldy      0,Y
1514:         jmp      0,Y
1515:
1516:
1517: LnkPakIDTable
1518:
```

```
MEDIALNK.ASM              PAGE 32  Thu Feb 22 10:27:11 1990

1519:        FDB      LnkRxRestart
1520:        FDB      LnkRxRestart
1521:        FDB      LnkRxRestart
1522:        FDB      LnkRxRestart
1523:        FDB      LnkRxRestart
1524:        FDB      LnkRxRestart
1525:        FDB      LnkRxRestart
1526:        FDB      LnkRxRestart
1527:        FDB      LnkRxRestart
1528:        FDB      LnkRxRestart
1529:        FDB      LnkRxResponse
1530:        FDB      LnkRxData
1531:        FDB      LnkRxSplice
1532:        FDB      LnkRxRestart
1533:        FDB      LnkRxVector
1534:        FDB      LnkRxBroadcast
1535:
1536:
1537: *
1538: *      CHECK GROUP ID TABLE FOR MATCH
1539: *
1540: LnkRxGroup
1541:        ldy      LNK_ID,X                  ; put group id in y
1542:        ldaa     #LnkGroupIDCount          ; count of ID Table entries
1543:        ldab     #LnkGroupIDLength         ; length of ID table entry
1544:        LDX      #LnkGroupIDTable          ; SETUP TABLE SEARCH
1545: LnkRxGroup10
1546:        CPY      0,X                       ; CHECK Y FOR MATCH
1547:        BEQ      LnkRxGroup30              ; MATCH - DISPATCH GROUP TO PACKET
1548:        ABX                                ; point to next ID entry
1549:        deca                               ; count down number of table entries
1550:        BNE      LnkRxGroup10
1551:
1552: *
1553: *      GROUP NOT FOR ME - INGORE AND RESTART Rx
1554: *
1555:
1556: LnkRxRestart                              ; UNKNOWN PACKET - TRASH IT AND RESTART Rx
1557:
1558:        CTDelayLong
1559:        LDX      #LnkSLAVE
1560:        STX      SysIRQCT
1561:        RTI
1562:
1563:
1564: *
1565: *      have Group match in ID table - extract handle from ID table and
1566: *      put in X context in Tsk
1567: *
1568: LnkRxGroup30
1569:        inx                                ; point to handle
1570:        inx
1571:        ldy      0,x                       ; handle to y
1572:        ldx      LnkPRxTskBak              ; get Tsk adrs
1573:        ldx      TskPTos,x                 ; extract stack pointer
1574:        sty      TskStkX,x                 ; save handle in contest
```

```
MEDIALNK.ASM              PAGE 33  Thu Feb 22 10:27:11 1990

1575:         ldx     LnkPRxDataBak             ; point back to data buffer
1576:
1577: *
1578: *       DISPATCH GROUP TO PACKET TASK
1579: *
1580: LnkRxBroadcast
1581:
1582:         LDAB    LNK_SEQ,X                 ; MAKE SURE Pak NOT ALREADY Rxed
1583:         CMPB    LnkRxSequence
1584:         BEQ     LnkRxRestart              ; ALREADY GOT THIS ONE - TRASH Pak
1585:         STAB    LnkRxSequence             ; RESET Rx TO THIS Tx SEQ NUMBER
1586:
1587:         CTDelayLong
1588:
1589:         LDX     #LnkSLAVE
1590:         STX     SysIRQCT
1591:         bra     LnkDispatch               ; send Pak to task
1592:
1593:
1594: *
1595: *       DATA PACKET FOR ME - DISPATCH TO PACKET TASK
1596: *
1597: LnkRxData
1598:
1599:         cmpb    SysNodeID                 ; packet for me?
1600:         bne     LnkRxRestart              ; no - trash it
1601:
1602:         LDAB    LNK_SID,X                 ; EXTRACT SENDER ID
1603:         STAB    LnkResDID                 ; PUT IT IN RESPONSE PACKET
1604:
1605:         LDAB    LNK_SEQ,X                 ; MAKE SURE Pak NOT ALREADY Rxed
1606:
1607:         CTDelay1
1608:
1609:         LDX     #LnkTxRESP
1610:         STX     SysIRQCT
1611:
1612:         CMPB    LnkRxSequence
1613:         BNE     LnkRxData05
1614:         RTI                               ; ALREADY GOT THIS ONE - TRASH Pak
1615: LnkRxData05
1616:         STAB    LnkRxSequence             ; RESET Rx TO THIS Tx SEQ NUMBER
1617:         STAB    LnkResSEQ                 ; RETURN SEQUENCE NUMBER TO Txer
1618:
1619: LnkDispatch
1620:
1621:         extern  RxDataCount(page0)        ; GOOD DATA FRAME COUNTER
1622:         inc     RxDataCount
1623:
1624:         LDX     PakPoolHead               ; CHECK IF BUFFER POOL OK
1625:         BEQ     LnkRxData10               ; EMPTY - REJECT PACKET
1626:
1627:         LDX     LnkPRxTskBak              ; POINT TO Rx Tsk
1628:
1629:         LDAA    #RET_OK                   ; GIVE TASK AN OK STATUS
1630:
```

```
MEDIALNK.ASM              PAGE 34  Thu Feb 22 10:27:11 1990

1631:         LDY     TskPTos,X              ; AND TOP OF Tsk STACK
1632:         STAA    TskStkA,Y              ; PUT RETURN STATUS IN STACK
1633:
1634:         tskQAdd                        ; ADD TO TSK QUEUE
1635:
1636:         RxNewPak                       ; SETUP Rx WITH A NEW Pak
1637:
1638:         RTI
1639:
1640: *
1641: *       POOL IS EMPTY - REJECT PACKET AND RETURN STATUS TO REMOTE
1642: *
1643: LnkRxData10
1644:
1645:         LDAA    #RET_ERROR             ; LOW POOL STATUS
1646:         STAA    LnkRSP                 ; PUT IN RESPONSE PACKET
1647:
1648:         RTI
1649:
1650:
1651: *
1652: *       VECTOR PACKET
1653: *
1654:
1655: LnkRxVector
1656:
1657: *
1658: *       INITIALIZE Tx AND Rx SEQUENCE NUMBERS
1659: *
1660:         LDD     #$00FF
1661:         STD     LnkTxSequence          ; Rx MUST BY LESS THAN Tx
1662:
1663:         STAB    LnkActive              ; keep alive orange led
1664:
1665: *
1666: *       NNR = MID - SID
1667: *
1668:         LDAA    SysNodeID              ; NNR = MID - SID
1669:         SUBA    LNK_SID,X
1670:         ANDA    #$0F                   ; JUST ALLOW 16 NNR VALUES
1671:         STAA    LnkNNR                 ; GET NEW VALUE FOR NNR
1672:
1673: *
1674: *       SAVE VECTOR INFO IN LnkVectorPak
1675: *
1676:         LDD     LNK_PDA,X
1677:         STD     LnkPDA
1678:
1679:         LDD     LNK_PMI,X
1680:         STD     LnkPMI
1681:
1682:         LDD     LNK_DID,X
1683:         STD     LnkVecDID
1684:
1685:         CMPB    SysNodeID              ; SysNodeID conflict?
1686:         BNE     LnkRxVector10
```

```
MEDIALNK.ASM              PAGE 35  Thu Feb 22 10:27:11 1990

1687:         bset    SysResetFlag,NodeIDConflictBit ; yes - signal ring to reset
1688:
1689: LnkRxVector10
1690:
1691:         CMPA    SysNodeID                      ; VECTOR TO ME?
1692:         BNE     LnkRxVector20                  ; NO - CHECK FOR SPLICE CONDITION
1693:
1694: *
1695: *       VECTOR TO ME
1696: *
1697:         staa    LnkVectorActive                ; top LED green
1698:
1699:         TBA                                    ; SID to A
1700:         TableIndex LnkPIDTable,LnkPMA          ; ENTER SID IN PID TABLE
1701:         STAA    0,X
1702:
1703:         tst     LnkVectorTimer                 ; OK to vector?
1704:         bne     LnkRxVector15                  ; yes - still have remote data
1705:
1706: *
1707: *       splice out time
1708: *
1709:         TableIndex LnkNIDTable,LnkPMA          ; get NID for SPD
1710:         ldaa    0,x
1711:         cmpa    SysNodeID                      ; am I next?
1712:         beq     LnkRxVector15                  ; yes - dont splice out
1713:
1714:         staa    LnkSPD                         ; store my NID as SPD
1715:         jmp     LnkRxVector88                  ; setup to splice out
1716:
1717: *
1718: *       RESET COUNTERS AND GO BACK TO VECTOR CT STATE
1719: *
1720: LnkRxVector15
1721:
1722:         CLR     LnkSCNT                        ; CLEAR PD COUNTERS
1723:         CLR     LnkPCNT
1724:
1725:         CTDelay2
1726:
1727:         LDX     #LnkVECTOR
1728:         STX     SysIRQCT
1729:
1730:         RTI
1731:
1732: *
1733: *       CHECK FOR SPLICE CONDITION
1734: *
1735:
1736: LnkRxVector20
1737:
1738:         tst     LnkVectorTimer                 ; need to splice in?
1739:         bne     LnkRxVector25                  ; yes - see if I need to splice in
1740:         jmp     LnkRxVector160                 ; no - exit
1741:
1742: LnkRxVector25
```

```
MEDIALNK.ASM              PAGE 36  Thu Feb 22 10:27:11 1990

1743:
1744:          TSTA                            ; DID = 0 ?
1745:          beq       LnkRxVector35         ; yes - init NID
1746:
1747: *
1748: *        CHECK IF SID<MID<DID or DID<SID<MID or MID<DID<SID
1749: *
1750:
1751:          CBA                             ; DID < SID ?
1752:          BCC       LnkRxVector40         ; NO
1753:          CMPB      SysNodeID             ; SID < MID ?
1754:          BCS       LnkRxVector30         ; YES - SPLICE IN
1755:          CMPA      SysNodeID             ; MID < DID ?
1756:          BCS       LnkRxVector50         ; NO
1757:
1758: LnkRxVector30
1759:
1760:          TableIndex  LnkNIDTable,LnkPMA
1761:          STAA      0,X                   ; NID(pma) DID
1762:
1763: LnkRxVector35
1764:
1765:          ldaa      SysNodeID             ; MID = spd
1766:          staa      LnkSPD
1767:
1768:          jmp       LnkRxVector75
1769:
1770: LnkRxVector40
1771:
1772:          CMPA      SysNodeID             ; MID < DID ?
1773:          BCS       LnkRxVector50         ; NO
1774:          CMPB      SysNodeID             ; SID < MID ?
1775:          BCS       LnkRxVector30         ; YES - SPLICE
1776:
1777: LnkRxVector50
1778:
1779: *
1780: *        CHECK IF MyPMA > PMA
1781: *
1782:
1783:          LDAA      LnkMyPMA
1784:          CMPA      LnkPMA
1785:          BHI       LnkRxVector60
1786:
1787: *
1788: *        CHECK IF DID = PID(pma)
1789: *
1790:
1791:          TableIndex    LnkPIDTable,LnkPMA
1792:
1793:          LDAA      0,X
1794:          CMPA      LnkVecDID
1795:          BNE       LnkRxVector160
1796:
1797:          LDAA      LnkSCNT               ; SCNT = 0?
1798:          BEQ       LnkRxVector140
```

```
MEDIALNK.ASM                PAGE 37  Thu Feb 22 10:27:11 1990

1799:          CMPA     #1
1800:          BNE      LnkRxVector150
1801:          BRA      LnkRxVector88
1802:
1803: LnkRxVector140
1804:
1805:          LDAA     #3                      ; SCNT = 2
1806:          STAA     LnkSCNT
1807:
1808: LnkRxVector150
1809:
1810:          DEC      LnkSCNT
1811:
1812:          BRA      LnkRxVector160
1813:
1814: LnkRxVector60
1815:
1816:          LDAA     LnkPCNT                 ; PCNT <= 1?
1817:          CMPA     #1
1818:          BGT      LnkRxVector70
1819:
1820:          CLR      LnkSCNT                 ; CLEAR PD COUNTERS
1821:          CLR      LnkPCNT
1822:
1823:          CTDelay1
1824:
1825:          LDX      #LnkUPLEVEL
1826:          STX      SysIRQCT
1827:
1828:          RTI
1829:
1830: LnkRxVector70
1831:
1832:          DEC      LnkPCNT                 ; PCNT = PCNT - 1
1833:
1834: LnkRxVector160
1835:
1836:          CTDelayLong
1837:
1838:          LDX      #LnkSLAVE
1839:          STX      SysIRQCT
1840:
1841:          RTI
1842:
1843: *
1844: *        DID = 0
1845: *
1846:
1847: LnkRxVector75
1848:
1849:          LDAA     LnkPCNT                 ; PCNT = 0
1850:          BEQ      LnkRxVector80           ; YES
1851:
1852:          CMPA     #1                      ; PCNT = 1?
1853:          BNE      LnkRxVector70
1854:
```

```
MEDIALNK.ASM              PAGE 38  Thu Feb 22 10:27:11 1990

1855: LnkRxVector88
1856:
1857:         CLR     LnkSCNT                 ; CLEAR PD COUNTERS
1858:         CLR     LnkPCNT
1859:
1860:         CTDelay1
1861:
1862:         LDX     #LnkSPLICE
1863:         STX     SysIRQCT
1864:
1865:         RTI
1866:
1867: *
1868: *       CHECK IF MyPMA = PMA
1869: *
1870:
1871: LnkRxVector80
1872:
1873:         LDAA    LnkMyPMA
1874:         CMPA    LnkPMA
1875:         BNE     LnkRxVector160
1876:
1877: *
1878: *       PCNT = NNR
1879: *
1880:
1881:         LDAA    LnkNNR
1882:         STAA    LnkPCNT
1883:
1884:         TST     LnkPMA                  ; PMA = 0 ?
1885:         BEQ     LnkRxVector88
1886:
1887:         LDX     PakPQOUT                ; DATA READY?
1888:         CPX     PakPQIN
1889:         BEQ     LnkRxVector88
1890:
1891:         BRA     LnkRxVector160
1892:
1893:
1894:
1895: *
1896: *       RESPONSE PACKET FOR ME - SEE IF I ORDERED IT
1897: *
1898:
1899: LnkRxResponse
1900:
1901:         cmpb    SysNodeID               ; packet for me?
1902:         beq     LnkRxResponse20         ; yes
1903:
1904: LnkRxResponse10
1905:
1906:         jmp     LnkRxRestart            ; no - trash packet
1907:
1908: LnkRxResponse20
1909:
1910:         LDAA    LNK_SEQ,X               ; MAKE SURE DATA SEQ = RESP SEQ
```

```
MEDIALNK.ASM            PAGE 39   Thu Feb 22 10:27:11 1990

1911:        CMPA     LnkTxSequence
1912:        BNE      LnkRxResponse10            ; NO - TRASH PACKET AND RESTART Rx
1913:
1914:        LDAA     LNK_RSP,X                  ; EXTRACT REMOTE RESPONSE FROM PACKET
1915:
1916:        LDX      #LnkRESP                   ; WAITING FOR A RESPONSE?
1917:        CPX      SysIRQCT
1918:        BNE      LnkRxResponse10            ; NO - TRASH PACKET AND RESTART Rx
1919:
1920: *
1921: *      RESPONSE IS FOR MY Tx - PUT REMOTE STATUS IN TskStkA
1922: *
1923:
1924:
1925:        extern   TxDataCount(page0)
1926:        inc      TxDataCount                ; DEBUG !!! COUNT Tx FRAMES
1927:
1928:        QuePak                              ; QUEUE PACKET IN TASK QUEUE
1929:
1930:        CTDelay1
1931:
1932:        LDX      #LnkVECTOR
1933:        STX      SysIRQCT
1934:        RTI
1935:
1936: *
1937: *      SPLICE PACKET FOR ME - PUT SPD IN NID TABLE
1938: *
1939: LnkRxSplice
1940:
1941:        cmpb     SysNodeID                  ; packet for me?
1942:        BNE      LnkRxResponse10            ; NO - TRASH PACKET AND RESTART Rx
1943:
1944:        ldaa     LNK_SPD,X                  ; NID is SPD
1945:        TableIndex LnkNIDTable,LnkPMA       ; INDEX INTO NID TABLE
1946:        STAA     0,X                        ; PUT INTO NID TABLE
1947:
1948:        CLR      LnkSCNT                    ; CLEAR PD COUNTERS
1949:        CLR      LnkPCNT
1950:
1951:        CTDelay2
1952:
1953:        LDX      #LnkVECTOR
1954:        STX      SysIRQCT
1955:        RTI
1956:
1957:
1958:        END
```

```
MEDIALNK.INC              PAGE 1  Thu Feb 22 10:29:08 1990

1: ;*********************************************************************
 2: ;
 3: ;      Project:      MidiTap
 4: ;
 5: ;      File:   MEDIALNK.INC
 6: ;
 7: ;      Copyright (C) 1989 by Lone Wolf, Inc.
 8: ;      All rights reserved.
 9: ;
10: ;      Author: Tim Tuttle (TT)
11: ;
12: ;      Description
13: ;
14: ;      This file contains exportable class macro,
15: ;      instance data structure and method definitions.
16: ;      It should be #included by any module wishing to
17: ;      deal with MEDIALNK class instances.
18: ;
19: ;*********************************************************************
20:
21: ;*********************************************************************
22: ;
23: ;      Date\Author   Change comments
24: ;      -----------   ---------------
25: ;
26: ;      RSS 9/19/89   reshuffle page0 decls
27: ;      RSS 9/20/89   deleted superclass ref error
28: ;      TT 9/29/89    ADD EXTERN FOR LnkPRxData
29: ;      TT 10/18/89   FRAME COUNTERS
30: ;      TT 10/23/89   declare LnkPDA bss
31: ;      TT 10/23/89   declare medialnk.task code
32: ;      TT 11/10/89   externs for Bak pointers
33: ;      TT 11/29/89   add sequence number externs
34: ;      TT 12/1/89    delete reference to LnkCBAUDValue
35: ;      TT 12/27/89   add Group ID Table help and equates
36: ;      TT 1/8/90     equate pakpool reserve count
37: ;      TT 1/16/90    add externs for LID flag and count
38: ;      TT 1/16/90    delete LIDSleeper extern
39: ;      TT 1/16/90    delete page0 refs
40: ;      TT 1/25/90    LnkResetFlag is BSS
41: ;      TT 1/30/90    renumber packet IDs to make vector unique
42: ;      TT 2/2/90     delete LnkResetFlag BSS
43: ;      TT 2/5/90     add LNK_VectorTime equate
44: ;
45: ;**********************lastmod** TT 2/5/90   10:56:34  ***************
46:
47: ;*********************************************************************
48: ; classhelp MEDIALNK     <one-liner description of class function>
49: ;
50: ; help MEDIALNK          <one-liner description>
51: ;
52: ; all lines beginning ';' consecutively from here are help text.
53: ; this help will be automatically converted into Norton's Guide
54: ; format. Do a help text block for each method. Delete these lines.
55:
56: ;*********************************************************************
```

```
MEDIALNK.INC              PAGE 2  Thu Feb 22 10:29:08 1990

57:
 58: #ifndef MEDIALNK_CLS
 59: #define MEDIALNK_CLS 1
 60:
 61:        beginSuperclass   MEDIALNK, MODULE
 62: #define THIS_INC MEDIALNK
 63:        beginClass    THIS_INC, MODULE
 64:
```

```
MEDIALNK.INC              PAGE 3   Thu Feb 22 10:29:08 1990

65: ;**********************************************************************
66: ;       define class instance data structure
67: ;**********************************************************************
68:
69: Setup.THIS_INC %MACRO P1, P2, P3
70:             %IFNB P1
71:             %ENDIF
72:             %IFNB P2
73:             %ENDIF
74:             %IFNB P3
75:             %ENDIF
76:          %ENDM
77:
78:
79:
```

```
MEDIALNK.INC            PAGE 4  Thu Feb 22 10:29:08 1990

80: ;********************************************************************
 81: ;       define class methods
 82: ;********************************************************************
 83:
 84: LNK_VectorTime    EQU    $FF                 ; no remote data timer
 85: *
 86: *       LINK Tx STATUS EQUATIONS
 87: *
 88: LNK_StatusOK      EQU    0                   ; DATA PACKET RESKPONSE OK
 89: LNK_StatusAbort   EQU    $FF                 ; Tx ABORT OF DATA PACKET
 90: *
 91: *       PACKET ID EQUATIONS
 92: *
 93: LNK_BroadcastID   EQU    $FFFF               ; BROADCAST ALL ID
 94: LNK_VectorID      EQU    $FE
 95: LNK_SynchID       EQU    $FD
 96: LNK_SpliceID      EQU    $FC
 97: LNK_DataID        EQU    $FB
 98: LNK_ResponseID    EQU    $FA
 99:
100: LNK_PakPoolReserve EQU   6                   ; reserve packets for link operation
101: ;********************************************************************
102: ; help Methods         Method definition macros
103: ;
104: ;       virtual       <name>  define a polymorphic method
105: ;
106: ;       function      <name>  define a direct function call method
107: ;                             actual function label is <class>.<name>
108: ;
109: ;<name> %MACRO               define an in-line method
110: ;       <code>
111: ;       %ENDM
112: ;
113: ;       override      <name>  override a superclass virtual method
114: ;                             actual function label is <class>.<name>
115: ;
116:
117: ;********************************************************************
118:
119: ;********************************************************************
120: ; help <method name>    <one-liner description>
121: ;
122: ;       help text for method name
123:
124: ;********************************************************************
125:
126: ;********************************************************************
127:
128:
```

```
MEDIALNK.INC              PAGE 5  Thu Feb 22 10:29:08 1990

129: ;***********************************************************************
130: ;      define superclass method overrides
131: ;***********************************************************************
132:
133:         code    lnkRxEOM
134:         code    lnkSLAVE
135:         code    medialnk.task
136:
137:         BSS     LnkPDA
138:         BSS     LnkLID
139:
140:
141: #undef THIS_INC
142:
143: #endif
144: ;_____ MEDIALNK.INC ends _____
145:
```

```
PACKET.INC              PAGE 1  Thu Feb 22 10:29:24 1990

1: ;***********************************************************************
 2: ;
 3: ;      Project:     MidiTap
 4: ;
 5: ;      File:  PACKET.INC
 6: ;
 7: ;      Copyright (C) 1989 by Lone Wolf, Inc.
 8: ;      All rights reserved.
 9: ;
10: ;      Author: Tim Tuttle (TT)
11: ;
12: ;      Description
13: ;
14: ;      This file contains exportable class macro,
15: ;      instance data structure and method definitions.
16: ;      It should be #included by any module wishing to
17: ;      deal with PACKET class instances.
18: ;
19: ;***********************************************************************
20:
21:
22:
23:
24: ;***********************************************************************
25: ;
26: ;      Date\Author     Change comments
27: ;      -----------     ---------------
28: ;
29: ;      TT 10/18/89     ADD HELP FOR pakIDSwap
30: ;      TT 11/13/89     increase Pak count from 25 to 32
31: ;      DJW 11/17/89    moved structure definitions inside endclass
32: ;      DJW 11/17/89    im not sure what changed
33: ;      TT 11/29/89     increase packet lth to 133 for sequence number
34: ;      TT 12/1/89      reduce Pak count to 30
35: ;      tt 12/7/89      define PAK_Cnt and PAK_Lth in PAGE0
36: ;      TT 12/11/89     move PAK_Cnt and PAK_Lth back to this inc
37: ;      RSS 12/22/89    Change to methods from subroutines
38: ;      RSS 12/22/89    Renamed PAK_Lth PAK_BufLth
39: ;      RSS 12/28/89    Removed Group List functions.
40: ;      rss 12/30/89    delete code for pakQuePacket
41: ;      DJW 1/8/90      declared pakAddxxx functions
42: ;      TT 1/14/90      delete refs to Bld calls
43:
44: ;****************************lastmod** TT  1/14/90   7:18:24 12 ************
45:
46:
47:
48: ;***********************************************************************
49: ; classhelp PACKET      <one-liner description of class function>
50: ;
51: ; help PACKET      <one-liner description>
52:
53: ;***********************************************************************
54:
55:
56:
```

```
PACKET.INC              PAGE 2   Thu Feb 22 10:29:24 1990

57:
 58: #ifndef PACKET_CLS
 59: #define PACKET_CLS 1
 60:
 61:         beginSuperclass  PACKET, MODULE, TASK
 62: #include <TASK.INC>
 63: #define THIS_INC PACKET
 64:         beginClass   THIS_INC, MODULE, TASK
 65:
 66:
 67:
 68:
 69: ;*********************************************************************
 70: ;       define externals
 71: ;*********************************************************************
 72:
 73:     extern   PakPQOUT(page0)
 74:     extern   PakPQIN(page0)
 75:     extern   PakPoolHead(page0)
 76:     extern   PakPoolCnt(page0)
 77:
 78:
 79:
 80:
 81: ;*********************************************************************
 82: ;       define class shared equates
 83: ;*********************************************************************
 84:
 85: PakLth            equ  TskLth
 86: PAK_Cnt           equ  28              ; count of Packets in pool
 87: PAK_BufLth        equ  133             ; length of data packet
 88: PAK_PreambleLth   EQU  5               ; LENGTH OF PAK PREAMBLE
 89:
 90:
 91:
 92:
 93:
 94: ;*********************************************************************
 95: ;       define class instance data structure
 96: ;*********************************************************************
 97:
 98:     pointer  PakPData              ; Pak begin address
 99:     pointer  PakPNext              ; Pak data begin address
100:     byte     PakCount              ; COUNT OF BYTES LEFT IN Pak
101:     pointer  PakPBuilder           ; TBD !!!!!!!
102:
103:     structure
104:        field    PAK_HdrID,1         ; PACKET ID
105:        field    PAK_HdrDID,1        ; DESTINATION ADDRESS
106:        field    PAK_HdrSID,1        ; source (my) ID
107:        field    PAK_HdrSEQ,1        ; Tx sequence number
108:        field    PAK_HdrRTV,1        ; real time vector
109:     endstruct Pak_Header
110:
111:     BSS      PakPoolBegin          ; begin of PakPool for .Free
112:
```

```
PACKEI.INC              PAGE 3  Thu Feb 22 10:29:24 1990

113: ; **** DJW 1/8/90
114:            function    pakAddByte
115:            function    pakAddBlock
116:            function    pakAddStruct
117:
118:
119:    function    pakAddQueue
120:    function    pakIOSwap
121:    function    pakSetBrdCast
122:    function    pakSetGroup
123:    function    pakSetNode
124: ;  override    new
125:    override    free
126:    override    initialize
127:
128:
129:
130: Setup.THIS_INC %MACRO PC, P2, P3
131:            %IFNB PC
132:                LDD #PC
133:            %ENDIF
134:            %IFNB P1
135:            %ENDIF
136:            %IFNB P2
137:            %ENDIF
138:            %IFNB P3
139:            %ENDIF
140:        %ENDM
141:
142:
143:
144:
145: ;*********************************************************************
146: ;       define class methods
147: ;*********************************************************************
148:
149: ;*********************************************************************
150: ; help pakAddByte              add a byte to a Packet
151: ; pakAddByte                   add a byte to a Packet
152: ;
153: ;       SYNTAX:
154: ;           pakAddByte [PTR]
155: ;
156: ;       Entry:  X = Reference to packet object (Handle/Addr)
157: ;               B = byte to be appended
158: ;
159: ;       Exit:   X = Addr of Packet Object
160: ;!seealso pakAddBlock pakAddStruct
161:
162: ;*********************************************************************
163:
164:
165: ;*********************************************************************
166: ; help pakAddBlock             add a block to a Packet
167: ; pakAddBlock                  add a block to a Packet
168: ;
```

```
PACKET.INC              PAGE 4  Thu Feb 22 10:29:24 1990

169: ;      SYNTAX:
170: ;              pakAddBlock [PTR]
171: ;
172: ;      Entry:  X = Reference to packet object (Handle/Addr)
173: ;              Y = pointer to block start
174: ;              B = # bytes to be appended
175: ;
176: ;      Exit:   X = Addr of Packet Object
177: ;              Sign is -ve if Block too big
178: ;!seealso pakAddByte pakAddStruct
179:
180: ;****************************************************************
181:
182:
183: ;****************************************************************
184: ; help pakAddStruct        reserve space for a structure
185: ; pakAddStruct             reserve space for a structure
186: ;
187: ;      SYNTAX:
188: ;              pakAddStruct [PTR]
189: ;
190: ;      Entry:  X = Reference to packet object (Handle/Addr)
191: ;              B = # bytes to be reserved
192: ;
193: ;      Exit:   X = Addr of Packet Object
194: ;              Y = pointer to first reserved byte
195: ;              Sign is -ve if Block too big
196: ;!seealso pakAddBlock pakAddByte
197:
198: ;****************************************************************
199:
200:
201: ;****************************************************************
202: ; help pakAddQueue    Place a packet in the transmission queue
203: ; pakAddQueue         Place a packet in the transmission queue
204: ;
205: ; SYNTAX:    pakAddQueue [PTR]
206: ;
207: ; Entry:    X = Tsk reference (Handle/Addr)
208: ;
209: ; Exit:     None
210:
211:
212:
213:
214: ;****************************************************************
215: ; help pakIDSwap      Swap SID and DID, Reinit Packet data buffer.
216: ; pakIDSwap           Swap SID and DID, Reinit Packet data buffer.
217: ;
218: ; SYNTAX:    pakIDSwap [PTR]
219: ;
220: ; Entry:    X = Reference to packet object (Handle/Addr)
221: ;
222: ; Exit:    X = Addr of Packet Object
223: ;         Y = Addr of Packet buffer
224: ;         B = Pak Size (5 bytes in Pak preamble)
```

```
PACKET.INC              PAGE 5  Thu Feb 22 10:29:24 1990

225: ;
226: ; Type:    Method function.
227:
228:
229:
230:
231: ;************************************************************************
232: ; help pakSetBrdcast   Set packet for broadcast to all DID's
233: ; pakSetBrdcast        Set packet for broadcast to all DID's
234: ;
235: ; SYNTAX:   pakSetBrdCast [PTR]
236: ;
237: ; Entry:    X = Reference to packet object (Handle/Addr)
238: ;           B = RTV (Packet Type)
239: ;
240: ; Exit:     X = Addr of Packet Object
241: ;           Y = Addr of Packet buffer
242: ;           B = Pak Size (5 bytes in Pak preamble)
243: ;           A = Status
244: ;
245: ; Type:    Method function.
246:
247:
248:
249: ;************************************************************************
250: ; help pakSetGroup   Set packet for broadcast to all specified groups
251: ; pakSetGroup        Set packet for broadcast to all specified groups
252: ;
253: ; SYNTAX:   pakSetGroup [PTR]
254: ;
255: ; Entry:    X = Reference to packet object (Handle/Addr)
256: ;           Y = Group ID
257: ;           B = RTV (Packet TYPE)
258: ;
259: ; Exit:     X = Addr of Packet Object
260: ;           Y = Addr of Packet buffer
261: ;           B = Pak Size (5 bytes in Pak preamble)
262: ;           A = Status
263: ;
264: ; Type:    Method function.
265:
266:
267:
268:
269: ;************************************************************************
270: ; help pakSetNode   Set packet for broadcast to specified node.
271: ; pakSetNode        Set packet for broadcast to specified node.
272: ;
273: ; SYNTAX:   pakSetNode [PTR]
274: ;
275: ; Entry:    X = Reference to packet object (Handle/Addr)
276: ;           A = Destination NodeID
277: ;           B = RTV (Packet TYPE)
278: ;
279: ; Exit:     X = Addr of Packet Object
280: ;           Y = Addr of Packet buffer
```

```
PACKET.INC              PAGE 6  Thu Feb 22 10:29:24 1990

281: ;          B = Pak Size (5 bytes in Pak preamble)
282: ;          A = Status
283: ;
284: ; Type:   Method function.
285:
286:
287:
288:
289:
290: ;***********************************************************************
291: ;       define superclass method overrides
292: ;***********************************************************************
293:
294:
295:
296:
297: ;***********************************************************************
298: ; help free            Return a buffer to PakPool
299: ; free                 Return a buffer to PakPool
300: ;
301: ; SYNTAX:   free [PTR]
302: ;
303: ; Entry:    X is reference to packet (Handle/Addr)
304: ;
305: ; Exit:     X is Addr of packet, Y and D are destroyed.
306: ;
307: ; Type:     Override method.
308:
309:
310:
311:
312:
313: ;***********************************************************************
314: ; help initialize      Initialize as task with ANR pakRxMgr
315: ; initialize           Initialize as task with ANR pakRxMgr
316: ;
317: ; SYNTAX:   initialize [PTR]
318: ;
319: ; Entry:    X is reference to packet (Handle/Addr)
320: ;
321: ; Exit:     X is Addr of packet,
322: ;           Y is addr pakRxMgr
323: ;           D is preserved.
324: ;
325: ; Type:     Override method.
326:
327:
328:
329:
330: ;***********************************************************************
331: ; help new             get  buffer from PakPool
332: ; new                  get  buffer from PakPool
333: ;
334: ; SYNTAX:   new PACKET [, ANR_address]
335: ;
336: ; Entry:    If TASK not present, then X = the addr of the Class TASK.
```

```
PACKET.INC              PAGE 7  Thu Feb 22 10:29:24 1990

337: ;          If PC not present, then D = PC to be filled in the stack frame.
338: ;
339: ; Exit:    X = addr of allocated Task if successful,  else X=0.
340: ;          Z flag is clear if successful, else Z is set.
341: ;          Y and D registers are preserved.
342: ;
343: ; Type:    Override method.
344:
345:
346:
347:
348:
349:        endClass     THIS_INC, new
350:
351:
352: #undef THIS_INC
353:
354: #endif
355: ;_____ PACKET.INC ends _____
356:
```

What is claimed is:

1. A method of communicating data via a communication network to a plurality of stations connected to the communication network, the method comprising:

for each station connected to the communication network,
(a) storing a current identifier identifying the station and a previous identifier identifying a previous station from which the station last received a vector, the received vector indicating that the station is allowed to transmit data;
(b) computing a delay interval upon sensing that a vector has been transmitted to the station, the delay interval being computed as a function of the current identifier and the previous identifier; and
(c) upon expiration of the delay interval, causing the station to transmit a vector to a next station via the network, the transmitted vector indicating that the next station is allowed to transmit data.

2. The method of claim 1, including causing the station to transmit data via the network to at least one other station prior to causing the station to transmit the vector to the next station.

3. The method of claim 2 further comprising allowing a different station whose current identifier lies between the current identifier and the previous identifier of the station to transmit data via the network to at least one other station upon expiration of a portion of the delay interval.

4. The method of claim 1, wherein the current identifier of the station comprises a value that identifies a logical position of the station in the network and the previous identifier of the station comprises a value that identifies a logical position of the previous station in the network.

5. A method of communicating data via a communication network between a sequence of active stations connected to the communication network, the method comprising:

(a) determining that a current active station has received a vector from a previous active station in the sequence via the network, the vector indicating that the current active station may transmit data;
(b) causing the current active station in the sequence to compute a delay interval as a function of a position of the current active station relative to a position of the previous active station upon determining that the vector has been received;
(c) if the current active station has stored data to be transmitted, causing the current active station in the sequence to transmit data to at least one station in the sequence upon expiration of the delay interval; and
(d) causing the current active station in the sequence to transmit a vector to a next active station in the sequence, the vector indicating that the next active station is allowed to transmit data.

6. The method of claim 5, wherein the position of the current active station comprises a value identifying the current active station and the position of the previous active station comprises a value identifying the previous active station.

7. The method of claim 5, further comprising allowing an inactive station positioned between the position of the previous active station and the position of the current active station to transmit data via the network to at least one other station before the current active station transmits data.

8. The method of claim 7, wherein allowing the inactive station to transmit data via the network further comprises:

(a) causing the inactive station to sense the transmission of the vector to the current active station in the sequence;
(b) causing the inactive station to become a newly active station by transmitting data via the network to at least one other station upon expiration of a portion of the delay interval; and
(c) causing the newly active station to transmit a vector to the current active station in the sequence indicating that the current active station may transmit data.

9. The method of claim 5, further comprising allowing the current active station to be removed from the sequence of active stations so that it no longer transmits data via the network by causing the previous station to send a vector to the next station in the sequence upon the expiration of the delay interval, the vector indicating that the next station is allowed to transmit data.

10. Apparatus included in each of the stations of a plurality of stations communicating with one another via a network, for determining a sequence in which the stations will transmit data via the network, comprising a processing unit for causing the station to:

(a) determine if the station has received a vector from a previous station in the sequence indicating that the station may transmit data via the network; and
(b) if the station has received the vector,
 (i) cause the station to compute a delay interval as a function of a current identifier that identifies the station and a previous identifier that identifies the previous station;
 (ii) wait for the delay interval to expire;
 (iii) if the station has stored data to be transmitted, transmit the data to at least one other station in the sequence; and
 (iv) transmit a vector to a next station in the sequence indicating that the next station may transmit data via the network.

11. The apparatus of claim 10, wherein the current identifier of the station comprises a value representing a logical position of the station in the network and the previous identifier comprises a value representing a logical position of the previous station in the network.

12. The apparatus of claim 10, wherein if the station has stored data to be transmitted and has not received a vector, the processing unit of the station further causes the station to:

(a) sense when a vector has been transmitted by previous station to another station via the network;
(b) determine if the current identifier of the station is between the current identifier of the previous station and the current identifier of said another station, and if so, cause the station to transmit data to at least one other station in the sequence upon expiration of a portion of the delay interval.

13. The apparatus of claim 10, wherein if the station does not transmit the vector to the next station, the processing unit of the station further causes the previous station to send a vector to the next station in the sequence upon the expiration of the delay interval, the vector indicating that the next station is allowed to transmit data.

* * * * *